(12) United States Patent
Takata et al.

(10) Patent No.: US 12,501,367 B2
(45) Date of Patent: Dec. 16, 2025

(54) TERMINAL, AND COMMUNICATION METHOD

(71) Applicant: Panasonic Intellectual Property Corporation of America, Torrance, CA (US)

(72) Inventors: Tomofumi Takata, Ishikawa (JP); Takashi Iwai, Ishikawa (JP); Yoshio Urabe, Nara (JP); Lei Huang, Singapore (SG); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 407 days.

(21) Appl. No.: 18/004,904

(22) PCT Filed: Jun. 3, 2021

(86) PCT No.: PCT/JP2021/021282
§ 371 (c)(1),
(2) Date: Jan. 10, 2023

(87) PCT Pub. No.: WO2022/014192
PCT Pub. Date: Jan. 20, 2022

(65) Prior Publication Data
US 2023/0247562 A1    Aug. 3, 2023

(30) Foreign Application Priority Data
Jul. 17, 2020  (JP) .................. 2020-122948

(51) Int. Cl.
*H04W 52/16* (2009.01)
*H04W 52/18* (2009.01)
*H04W 76/14* (2018.01)

(52) U.S. Cl.
CPC .......... *H04W 52/16* (2013.01); *H04W 52/18* (2013.01); *H04W 76/14* (2018.02)

(58) Field of Classification Search
CPC ...... H04W 52/16; H04W 76/14; H04W 52/18
See application file for complete search history.

(56) References Cited

U.S. PATENT DOCUMENTS

2013/0244715 A1* 9/2013 Kwon ................. H04W 52/243
455/522
2013/0324182 A1* 12/2013 Deng .................. H04W 52/242
455/522

(Continued)

FOREIGN PATENT DOCUMENTS

EP        3099120 A1    11/2016
JP      2017-526204 A     9/2017

(Continued)

OTHER PUBLICATIONS

Tian et al., "Remaining topics in power control", doc IEEE 802.11-16/0617r1 (Year: 2016).*

(Continued)

*Primary Examiner* — Joseph A Bednash
(74) *Attorney, Agent, or Firm* — Seed Intellectual Property Law Group PLLC

(57) ABSTRACT

The objective of the present invention is to suppress interference on an access point as a result of terminal-to-terminal communication. This terminal is provided with: a control circuit which performs transmission power control of a second link with another terminal, on the basis of a parameter relating to the state of a first link with an access point; and a transmitting circuit which transmits signals in accordance with the transmission power control.

7 Claims, 31 Drawing Sheets

| AID12 | RU Allocation | UL FEC Coding Type | UL HE-MCS | UL DCM | SS Allocation/ RA-RU information | UL Target RSSI (high priority for P2P) | UL Target RSSI#2 (low priority for P2P) | Reserved | Trigger Dependent User info |
|---|---|---|---|---|---|---|---|---|---|

(56) References Cited

U.S. PATENT DOCUMENTS

| | | | |
|---|---|---|---|
| 2016/0050698 A1* | 2/2016 | Siomina | H04W 72/20 370/329 |
| 2016/0242144 A1* | 8/2016 | Adachi | H04W 4/90 |
| 2017/0208554 A1 | 7/2017 | Hoshino et al. | |
| 2022/0078721 A1 | 3/2022 | Xue et al. | |
| 2022/0303909 A1* | 9/2022 | Kwon | H04W 52/383 |

FOREIGN PATENT DOCUMENTS

| | | | | |
|---|---|---|---|---|
| WO | WO-2019095807 A1 * | 5/2019 | | H04W 52/18 |
| WO | WO 2020106336 A1 | 5/2020 | | |
| WO | WO 2020143835 A1 | 7/2020 | | |

OTHER PUBLICATIONS

Baron et al., "Direct Link MU transmissions," IEEE 802.11-19/1117r2, Sep. 15, 2019, 11 pages.

Baron et al., "Triggered P2P transmissions," IEEE 802.11-20/0095r1, Mar. 18, 2020, 9 pages.

Baron et al., "Triggered P2P transmissions follow up," IEEE 802.11-20/0813r0, May 7, 2020, 9 pages.

Das et al., "Triggered P2P," IEEE 802.11-19/1604r1, Aug. 23, 2019, 15 pages.

Das et al., "Triggered P2P for 11be Release 1," IEEE 802.11-20/871r1, Aug. 23, 2019, 11 pages.

IEEE, "IEEE Standard for Information technology—Telecommunication and information exchange between systems Local and metropolitan area networks—Specific requirements, Part 11: Wireless LAN Medium Access Control (MAC) and Physical Layer (PHY) Specification," IEEE Computer Society, IEEE Std 802.11™-2016, Dec. 2016, 3534 pages.

IEEE, "IEEE P802.11ax™/D6.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE Computer Society, IEEE P802.11ax/D6.0, Nov. 2019, 780 pages.

International Search Report, mailed Jul. 27, 2021, corresponding to International Application No. PCT/JP2021/021282, 4 pages.

Extended European Search Report dated Dec. 6, 2023, for the corresponding European Patent Application No. 21841803.6, 9 pages.

* cited by examiner

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag-ments | Retry | Power Management | More Data | Protected Frame | +HTC/ Order |
| 2 | 2 | 4 | 1 | 1 | 1 | 1 | 1 | 1 | 1 | 1 |

Bits:

FIG. 4

| Type value B3 B2 | Type description | Subtype value B7 B6 B5 B4 | Subtype description |
|---|---|---|---|
| 10 | Data | 0011 | Data +CF-Ack +CF-Poll |
| 10 | Data | 0100 | Null (no data) |
| 10 | Data | 0101 | CF-Ack (no data) |
| 10 | Data | 0110 | CF-Poll (no data) |
| 10 | Data | 0111 | CF-Ack +CF-Poll (no data) |
| 10 | Data | 1000 | QoS Data |
| 10 | Data | 1001 | QoS Data +CF-Ack |
| 10 | Data | 1010 | QoS Data +CF-Poll |
| 10 | Data | 1011 | QoS Data +CF-Ack +CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | QoS CF-Ack +CF-Poll (no data) |
| 11 | Extension | 0000 | DMG Beacon |
| 11 | Extension | 0001–1111 | Reserved |

FIG. 5

| Applicable frame (sub) types | Bits 0-3 | Bit 4 | Bits 5-6 | Bit 7 | Bit 8 | Bit 9 | Bit 10 | Bits 11-15 |
|---|---|---|---|---|---|---|---|---|
| QoS CF-Poll and QoS CF-Ack +CF-Poll frames sent by HC | TID | EOSP | Ack Policy | Reserved | TXOP Limit | | | |
| QoS Data +CF-Poll and QoS Data +CF-Ack +CF-Poll frames sent by HC | TID | EOSP | Ack Policy | A-MSDU Present | TXOP Limit | | | |
| QoS Data and QoS Data +CF-Ack frames sent by HC | TID | EOSP | Ack Policy | A-MSDU Present | AP PS Buffer State | | | |
| QoS Null frames sent by HC | TID | EOSP | Ack Policy | Reserved | AP PS Buffer State | | | |
| QoS Data and QoS Data +CF-Ack frames sent by non-AP STAs that are not a TPU buffer STA or a TPU sleep STA in a nonmesh BSS | TID | 0 | Ack Policy | A-MSDU Present | TXOP Duration Requested | | | |
| | TID | 1 | Ack Policy | A-MSDU Present | Queue Size | | | |
| QoS Null frames sent by non-AP STAs that are not a TPU buffer STA or a TPU sleep STA in a nonmesh BSS | TID | 0 | Ack Policy | Reserved | TXOP Duration Requested | | | |
| | TID | 1 | Ack Policy | Reserved | Queue Size | | | |
| QoS Data and QoS Data +CF-Ack frames sent by TPU buffer STAs in a nonmesh BSS | TID | EOSP | Ack Policy | A-MSDU Present | Reserved | | | |
| QoS Null frames sent by TPU buffer STAs in a nonmesh BSS | TID | EOSP | Ack Policy | Reserved | Reserved | | | |
| QoS Data and QoS Data +CF-Ack frames sent by TPU sleep STAs in a nonmesh BSS | TID | Reserved | Ack Policy | A-MSDU Present | Reserved | | | |
| QoS Null frames sent by TPU sleep STAs in a nonmesh BSS | TID | Reserved | Ack Policy | Reserved | Reserved | | | |
| All frames sent by mesh STAs in a mesh BSS | TID | EOSP | Ack Policy | A-MSDU Present | Mesh Control Present | Mesh Power Save Level | RSPI | Reserved |

FIG. 6

| Control ID value | Meaning | Length of the Control Information subfield (bits) | Content of the Control Information subfield |
|---|---|---|---|
| 0 | Triggered response scheduling (TRS) | 26 | See 9.2.4.6a.1 (TRS Control) |
| 1 | Operating mode (OM) | 12 | See 9.2.4.6a.2 (OM Control) |
| 2 | HE link adaptation (HLA) | 26 | See 9.2.4.6a.3 (HLA Control) |
| 3 | Buffer status report (BSR) | 26 | See 9.2.4.6a.4 (BSR Control) |
| 4 | UL power headroom (UPH) | 8 | See 9.2.4.6a.5 (UPH Control) |
| 5 | Bandwidth query report (BQR) | 10 | See 9.2.4.6a.6 (BQR Control) |
| 6 | Command and status (CAS) | 8 | See 9.2.4.6a.7 (CAS Control) |
| 7-14 | Reserved | | |
| 15 | Ones need expansion surely (ONES) | 26 | See 10.8 (HT Control field operation) |

| Trigger Type | UL Length | More TF | CS Required | UL BW | ... | AP TX Power | ... | Trigger Dependent Common Info |
|---|---|---|---|---|---|---|---|---|

FIG. 15

| AID12 | UL FEC Coding Type | UL HE-MCS | UL DCM | SS Allocation/ RA-RU information | UL Target RSSI | Reserved | Trigger Dependent User info |

FIG. 16

| AID12 | RU Allocation | UL FEC Coding Type | UL HE-MCS | UL DCM | SS Allocation/ RA-RU information | UL Target RSSI (high priority for P2P) | UL Target RSSI#2 (low priority for P2P) | Reserved | Trigger Dependent User info |
|---|---|---|---|---|---|---|---|---|---|

FIG. 17

| UL Target RSSI subfield | Description |
|---|---|
| 0-90 | Values 0 to 90 map to −110 dBm to −20 dBm |
| 91-126 | Reserved |
| 127 | Indicates to the STA to transmit an HE TB PPDU response at its maximum transmit power for the assigned HE-MCS |

FIG. 18

| Priority | Condition |
|---|---|
| High | Management frame<br>Control frame |
| Low | Data frame |

FIG. 19

| Priority | Condition |
|---|---|
| High | Management frame<br>Control frame (ACK, Block ACK) |
| Low | Control frame (ACK, Block ACK以外)<br>Data frame |

FIG. 20

| Priority | Condition |
|---|---|
| High | AC_VO, AC_VI |
| Low | AC_BK, AC_BE |

FIG. 21

| Priority | Condition |
|---|---|
| High | TID $\geq$ 4 |
| Low | TID < 4 |

FIG. 22

| ACI Bitmap | Delta TID | ACI High | Scaling Factor | Queue Size High | Queue Size All | Required Target RSSI |
|---|---|---|---|---|---|---|
| 4 | 2 | 2 | 2 | 6 | 6 | 4 |

Bits

FIG. 24

| TID | EOSP | ACK Policy | A-MSDU present | Queue Size | Required Target RSSI |
|---|---|---|---|---|---|
| 4 | 1 | 2 | 1 | 4 | 4 |

Bits

FIG. 28

| Control ID Value | Meaning |
|---|---|
| 0 | Triggered response Scheduling (TRS) |
| 1 | Operating mode (OM) |
| 2 | HE link adaptation (HLA) |
| 3 | Buffer status report (BSR) |
| 4 | UL Power headroom (UPH) |
| 5 | Bandwidth query report (BQR) |
| 6 | Command and status (CA) |
| 7 | TID-based Buffer status report (BSR) |
| 8-14 | Reserved |
| 15 | Ones need expansion surely (ONES) |

FIG. 29

| TID | Queue Size | Required Target RSSI |
|---|---|---|

FIG. 30

| TID | Queue Size |
|---|---|

FIG. 31

| Control ID Value | Meaning |
|---|---|
| 0 | Triggered response Scheduling (TRS) |
| 1 | Operating mode (OM) |
| 2 | HE link adaptation (HLA) |
| 3 | Buffer status report (BSR) |
| 4 | UL Power headroom (UPH) |
| 5 | Bandwidth query report (BQR) |
| 6 | Command and status (CA) |
| 7 | Required Target RSSI report (RTRR) |
| 8-14 | Reserved |
| 15 | Ones need expansion surely (ONES) |

FIG. 32

| Required Target RSSI |
|---|

FIG. 33

| Required Target RSSI | MCS |
|---|---|

FIG. 34

| Required Target RSSI | TID |
|---|---|

FIG. 35

TERMINAL, AND COMMUNICATION METHOD

TECHNICAL FIELD

The present disclosure relates to a terminal and a communication method.

BACKGROUND ART

IEEE 802.11be (hereinafter referred to as "11be"), which is technical specifications of the Institute of Electrical and Electronics Engineers (IEEE) 802.11, has been developed as a successor standard of IEEE 802.11ax (hereinafter referred to as "11ax").

For example, in 11be, methods (e.g., Triggered P2P) have been studied in which an Access Point (also referred to as a "base station") (hereinafter referred to as "AP") triggers communication between a terminal (hereinafter referred to as "Station (ST)") and another terminal (e.g., inter-terminal communication, peer to peer (P2P), or Direct Link (DiL)) (see, e.g., Non-Patent Literatures (hereinafter, referred to as "NPLs") 1 to 5).

CITATION LIST

Non-Patent Literature
NPL 1
  IEEE 802.11-19/1604r1, Triggered P2P
NPL 2
  IEEE 802.11-20/0095r1, Triggered P2P transmissions
NPL 3
  IEEE 802.11-19/1117r2, Direct Link MU transmissions
NPL 4
  IEEE 802.11-20/0813r0, Triggered P2P transmissions follow up
NPL 5
  IEEE 802.11-20/0871r1, Triggered P2P for 11be Release 1
NPL 6
  IEEE P802.11ax/D6.0, November 2019
NPL 7
  IEEE 802.11-2016, December 2016

SUMMARY OF INVENTION

However, a method for suppressing interference to an access point due to inter-terminal communication has not comprehensively been studied.

One non-limiting exemplary embodiment of the present disclosure facilitates providing a terminal and a communication method that suppress interference with an access point by inter-terminal communication.

A terminal according to one exemplary embodiment of the present disclosure includes control circuitry, which, in operation, performs transmit power control for a second link to another terminal based on a parameter relevant to a first link to an access point; and transmission circuitry, which, in operation, transmits a signal in the second link in accordance with the transmit power control.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one exemplary embodiment of the present disclosure, it is possible to suppress interference with an access point by inter-terminal communication.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4 illustrates one exemplary Frame Control field;

FIG. 5 illustrates one exemplary configuration value in the Frame Control field;

FIG. 6 illustrates one exemplary configuration value in a Quality of Service (QoS) Control field;

FIG. 7 illustrates one exemplary configuration value in a Control ID subfield;

FIG. 15 illustrates one exemplary format of the Common info field;

FIG. 16 illustrates one exemplary format of the User Info field;

FIG. 17 illustrates one exemplary format of the User Info field;

FIG. 18 illustrates one exemplary configuration value in a UL Target RSSI subfield;

FIG. 19 illustrates one example of priority

FIG. 20 illustrates one example of priority

FIG. 21 illustrates one example of priority;

FIG. 22 illustrates one example of priority;

FIG. 24 illustrates one exemplary Buffer Status Report (BSR) format;

FIG. 28 illustrates one exemplary format of the QoS Control field;

FIG. 29 illustrates one exemplary configuration value in a Control ID subfield;

FIG. 30 illustrates one exemplary Traffic Identify (TID)-based BSR format;

FIG. 31 illustrates one exemplary TID-based BSR format;

FIG. 32 illustrates one exemplary configuration value in the Control ID subfield;

FIG. 33 illustrates one example of a Required Target RSSI report (RTRR) format;

FIG. 34 illustrates one exemplary RTRR format;

FIG. 35 illustrates one exemplary RTRR format;

DESCRIPTION OF EMBODIMENTS

Hereinafter, embodiments of the present disclosure will be described in detail with reference to the drawings.

[11ax Transmission Procedure]

For example, 11ax supports Multi-User (MU) transmission in Uplink (UL). The UL MU transmission includes, for example, MU-Multiple Input Multiple Output (MU-MIMO) and Orthogonal Frequency Division Multiple Access (OFDMA). In a UL MU transmission procedure in 11ax, for example, an AP may transmit a signal (also referred to as a "Trigger frame") that is a trigger for an uplink signal to a plurality of STAs accommodated. A terminal may transmit an uplink signal (also referred to as an uplink response signal, for example) to the AP based on the Trigger frame, for example. The uplink response signal is also referred to as, for example, a Trigger based Physical layer convergence procedure Protocol Data Unit (TB PPDU).

Figure 1:
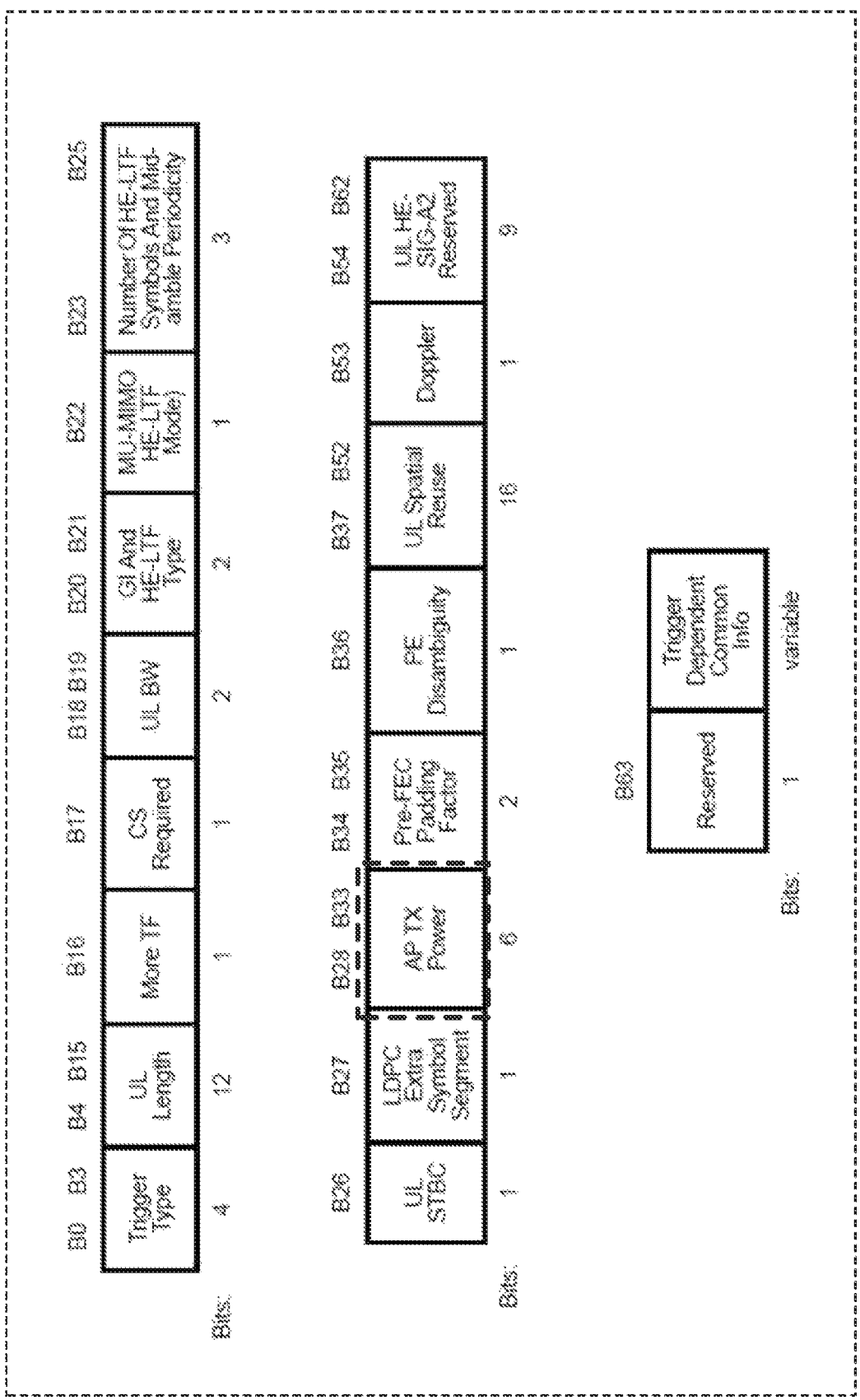
FIG. 1 illustrates one exemplary format of a Common Info field.

For example, an uplink transmit power control may be applied in the STA when the uplink response signal is transmitted. The uplink transmit power control may be calculated according to following Equations 1 and 2 using, for example, a configuration value of an "AP TX Power" field relevant to the transmit power of the AP in a Downlink (DL) that is included in a Common Info field within the Trigger frame illustrated in FIG. 1 and a configuration value of a "UI Target RSSI" field relevant to a target received signal strength (for example, target Received Signal Strength Indicator (RSSI)) of the AP in the uplink that is included in a User Info field within the Trigger frame illustrated in FIG. 2 (see, for example, NPL 6).

Note that the target received signal strength indicator (target RSSI) may also be referred to as target received power. In addition, the Common Info field may include, for example, information common to a plurality of STAs (also referred to as "common information" or "STA common information"). Further, the User Info field may include, for example, specific information for each STA (e.g., referred to as "user information," "STA-specific information," or "user-specific information").

$$PL_{DL} = Tx_{pwr}^{AP} - DL_{RSSI} \quad \text{(Equation 1)}$$

$$Tx_{pwr}^{STA} = PL_{DL} + Target_{RSSI} \quad \text{(Equation 2)}$$

In Equations 1 and 2, $PL_{DL}$ represents a path loss ([dBm]) in the downlink, $Tx_{pwr}^{AP}$ represents a configuration value (e.g., a transmit power value) ([dBm]) in the AP TX Power field, $DL_{RSSI}$ represents a received strength (e.g., RSSI) ([dBm]) of a downlink signal estimated (or measured) at the STA, and $Target_{RSSI}$ represents a configuration value ([dBm]) in the UL Target RSSI field.

Figure 3:
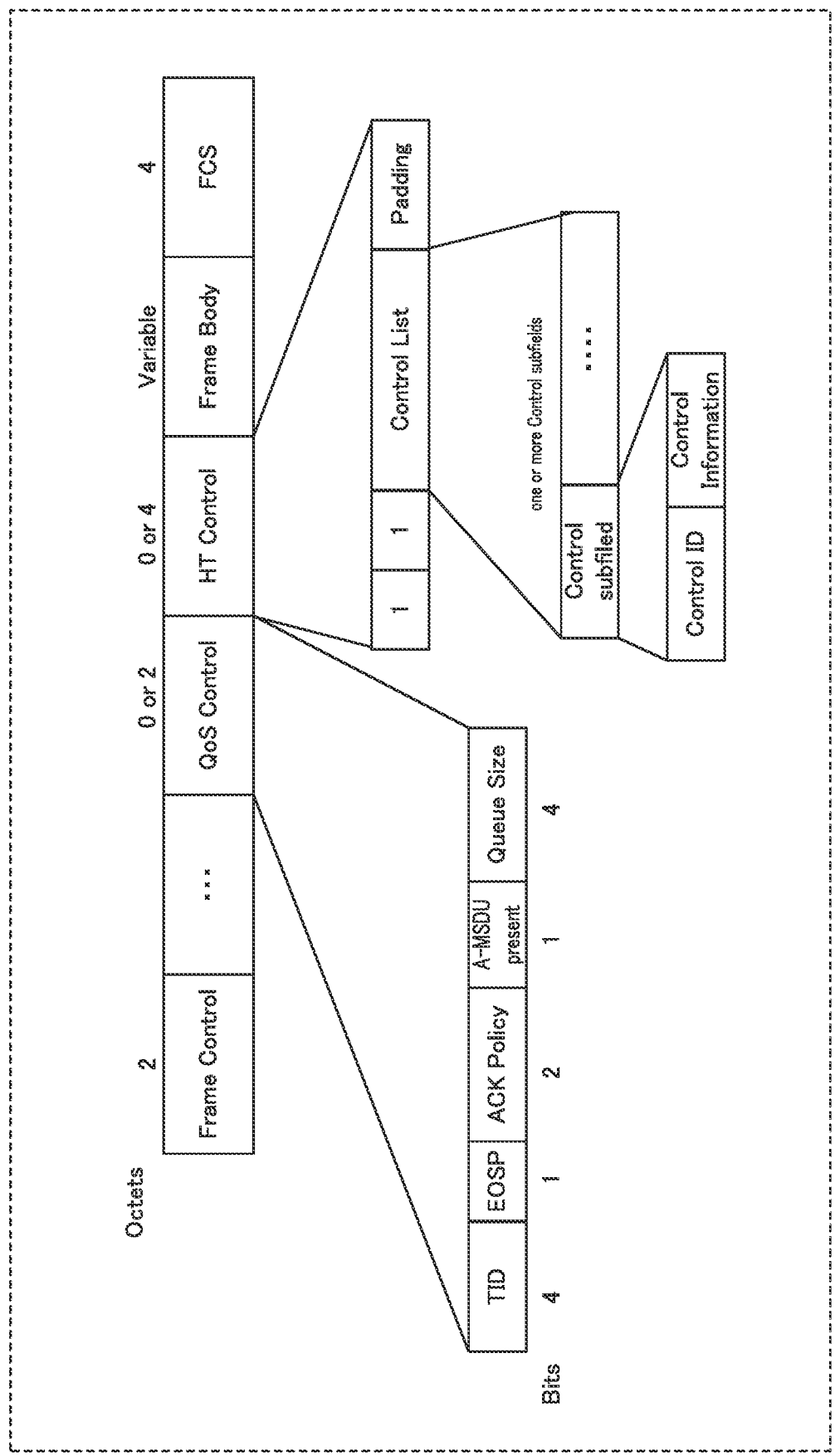
FIG. 3 illustrates one exemplary format of a Medium Access Control (MAC) frame.

FIG. 3 is a diagram illustrating one exemplary format of a Medium Access Control (MAC) frame in 11ax (see, for example, NPLs 6 and 7). The MAC frame may include, for example, a "Frame Control" field, a "Quality of Service (QoS) Control" field, and a "High Throughput (HT) Control" field.

FIG. 4 is a diagram illustrating one exemplary Frame Control field in the MAC frame. FIG. 5 is a diagram illustrating exemplary configuration values (e.g., Type value and Subtype value) in the Frame Control field.

In FIG. 5, for example, when the value (Type value) in the Type field in the Frame Control field is "Data" (for example, the field value is "10") and bit #7 (B7) of the value (Subtype value) in the SubType field is "1" (the area boxed by a dotted line in FIG. 5), the size of the QoS Control field in the MAC frame is 2 byte. Meanwhile, in the case of the Type different from the combination of the value "Data" in the Data field and "1" at bit #7 (B7) of the value in the Subtype field, the size of the QoS Control field is 0 byte.

FIG. 6 is a diagram illustrating one example of parameters indicated by respective bits (e.g., Bits 0-15) of the QoS Control field in the MAC frame. As illustrated in FIG. 6, the QoS Control field may include parameters such as "Traffic Identify (TID)" indicating the type of traffic held or "Queue Size" indicating the amount of traffic held (e.g., queue size).

Also, a HT Control field in the MAC frame may include, for example, one or more Control subfields, as illustrated in FIG. 3. The Control subfields may include, for example, Control ID for identifying the type of control information. FIG. 7 is a diagram illustrating one example of configuration values of the Control ID. As illustrated in FIG. 7, the STA can distinguish the type of the control information by the Control ID.

[Triggered P2P]

In Triggered P2P, like the UL MU transmission in 11ax, the AP may transmit, to a terminal (e.g., referred to as a "Direct Link Scheduled (DLS) STA") that initiates transmission by P2P, a control signal (e.g., a Trigger frame) that is a trigger for a P2P The Trigger frame may include, for example, information on resources used for P2P link transmission. The terminal may transmit data to the STA (e.g., referred to as a "Direct Link Peer (DLP) STA") in a P2P link (or referred to as a Direct Link), for example, after receiving the Trigger frame.

In addition, in Triggered P2P, for example, a method for dividing uplink resources indicated by the Trigger frame (for example, referred to as uplink resources) and P2P resources (for example, referred to as a P2P resource) in the time domain (for example, referred to as time resource sharing) and a method for dividing the uplink resources and P2P resources in the frequency domain (for example, referred to as frequency resource sharing) have been studied.

However, methods for the transmit power control for Triggered P2P have not comprehensively been studied.

Therefore, one exemplary embodiment of the present disclosure will be described, for example, in relation to a method for appropriately controlling the transmit power for Triggered P2P.

Examples of a P2P link transmission control (e.g., transmit power control) include a method in which a control relevant to the interference with the AP is not performed based on information on the P2P link. In such a P2P link transmission control based on this method, interference may occur when the P2P resource and the uplink resource are frequency-multiplexed. For example, when a large power difference (e.g., a power difference greater than or equal to a threshold) occurs between the received power for an uplink signal and the received power for a P2P link signal in signal reception by the AP, interference (e.g., also referred to as Adjacent channel interference or Inter-RU Interference) may occur between adjacent frequency bands.

Figure 8:
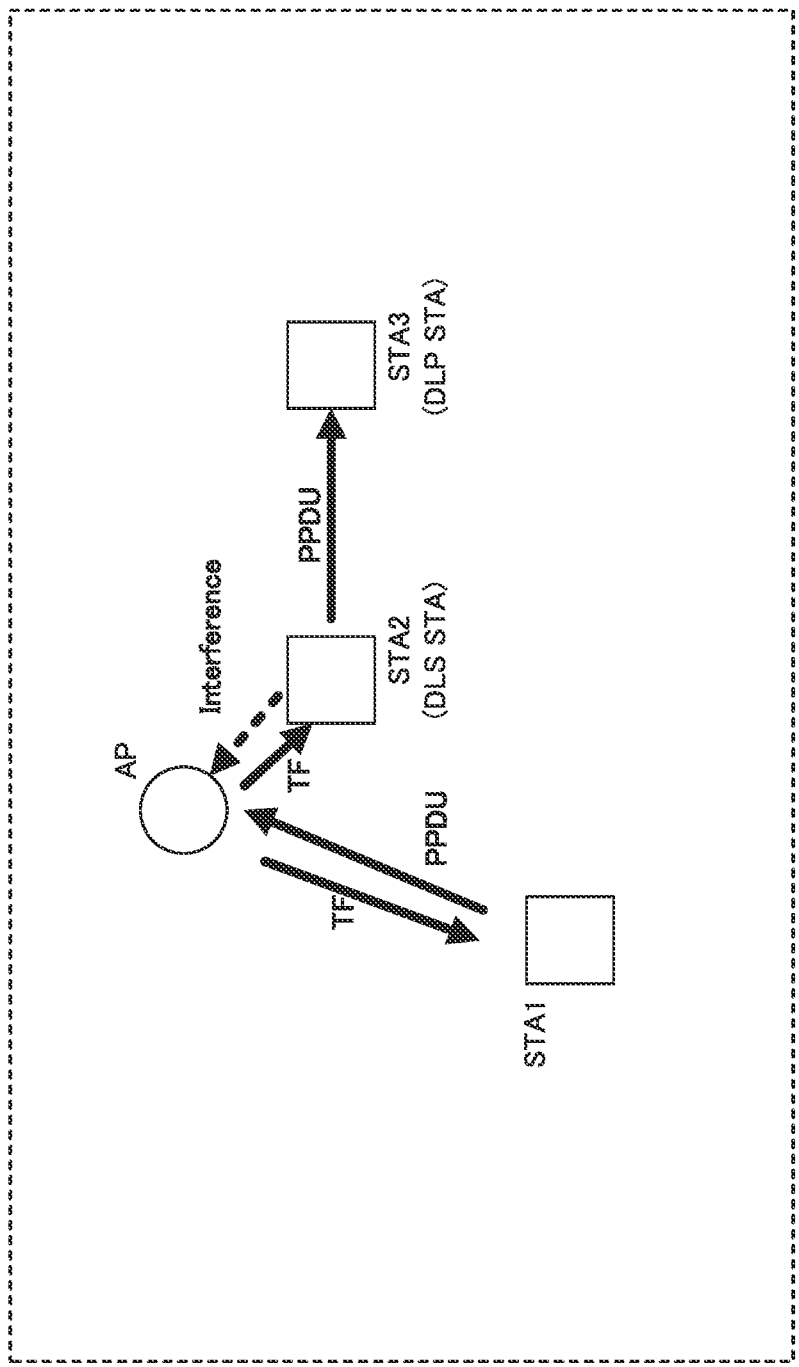
FIG. 8 is a diagram illustrating a configuration example of a radio communication system.
Figure 9:
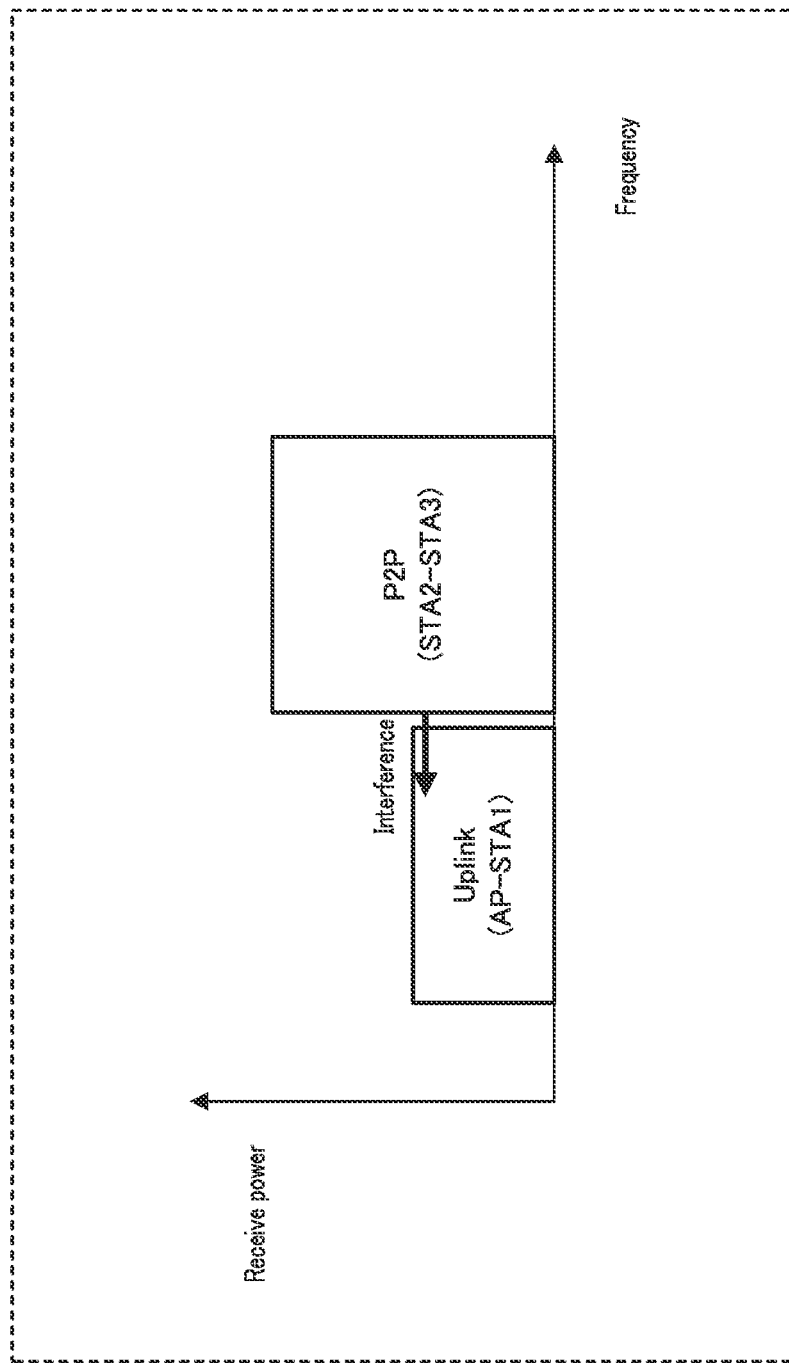
FIG. 9 illustrates one exemplary received power in an AP.

FIG. 8 illustrates a configuration example of a radio communication system. FIG. 9 illustrates exemplary received power at an AP in the radio communication system illustrated in FIG. 8.

In FIG. 8, for example, the AP may trigger, for STA 1, uplink transmission (e.g., communication between STA 1 and the AP) by the Trigger frame (e.g., represented as TF). Also, in FIG. 8, for example, the AP may trigger, for STA 2, P2P link transmission (e.g., communication between STA 2 and STA 3) by the Trigger frame.

As illustrated in FIG. 8, when both of the uplink and P2P link transmissions triggered by the Trigger frames are performed, the AP may be interfered by the P2P link transmission by STA 2. For example, as illustrated in FIG. 9, in the AP, when the received power of a signal in the P2P link (e.g., STA 2-STA 3 communication) is greater than the received power of a signal in the uplink (e.g., STA 1-AP communication), the reception performance of the uplink signal may deteriorate due to the effect of interference (e.g., Adjacent channel interference).

Figure 10:
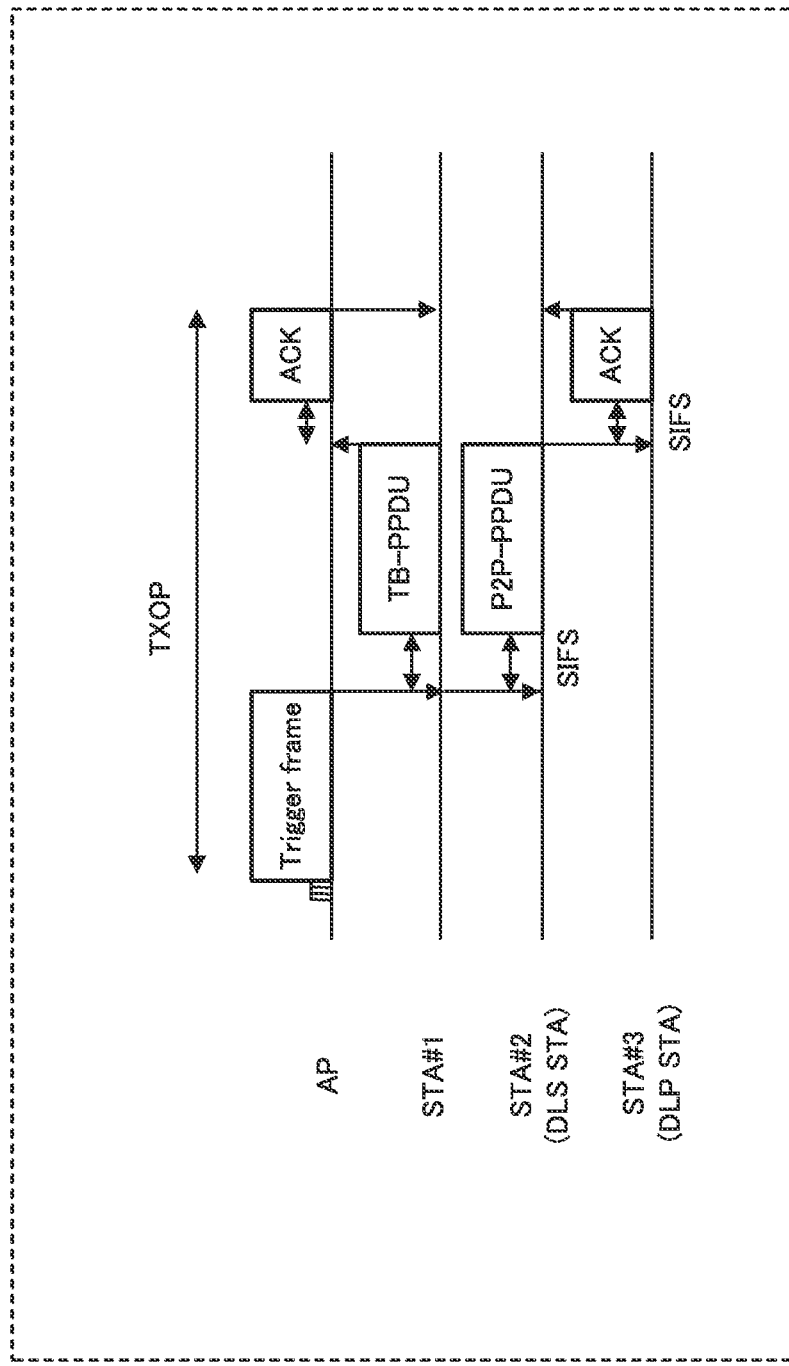
FIG. 10 is a sequence diagram illustrating one example of transmission processing in the radio communication system.

FIG. 10 is a sequence diagram illustrating one example of the uplink transmission and P2P link transmission.

As illustrated in FIG. 10, for example, the AP may transmit the Trigger frame upon obtaining a time resource (e.g., transmission opportunity (TXOP)).

In addition, each of the STAs (for example, STA #1 and STA #2 in FIG. 10) having received the Trigger frame may transmit a signal (for example, a TB-PPDU) in the uplink (for example, STA #1-AP) or a signal (for example, a P2P-PPDU) in the P2P link (e.g., STA 2-STA 3) after elapse of a defined period (for example, a Short Inter Frame Space (SIFS) after the transmission and reception of the Trigger frame. The P2P-PPDU may be, for example, any one of a single user (SU)-PPDU, a multi user (MU)-PPDU, or a trigger based (TB)-PPDU, In FIG. 10, STA #3 (e.g., DLP STA) or the AP may transmit a response signal (e.g., ACK) after the SIFS has elapsed after the reception of the PPDU, for example. For example, as illustrated in FIG. 10, P2P link transmission processing indicated by the Trigger frame may be performed within the TXOP obtained by the AP. In FIG. 10, STA 2 and STA 3 may be in the same Basic Service Set (BSS) or may be in different BSSs.

One exemplary embodiment of the present disclosure will be described in relation to a method in which, for example, when the uplink transmission and P2P link transmission indicated by the Trigger frames are frequency-multiplexed, the P2P link transmit power control is appropriately controlled, and the interference by the P2P link transmission with uplink reception processing of the AP is thus reduced.

In this method, for example, it is possible to reduce the interference with the uplink reception processing of the AP by the P2P link transmission, so as to improve uplink throughput.

EMBODIMENT 1

[Configuration of Radio Communication System]

The radio communication system according to the present embodiment may include, for example, AP 100 and STA 200.

For example, in the present embodiment, AP 100 may notify STA 200 of at least one of uplink and P2P link transmission controls by the Trigger frame. The term "notify" may be exchanged with "transmit" or "indicate." STA 200 may perform at least one of the uplink transmission and P2P link transmission, for example, based on the Trigger frame notified by AP 100.

Hereinafter, an exemplary configuration of AP 100 and STA 200 according to the present embodiment will be described.

Figure 11:
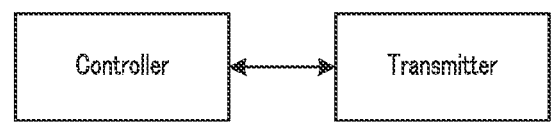
FIG. 11 is a block diagram illustrating an exemplary configuration of part of an STA.

FIG. 11 is a block diagram illustrating a configuration example of a part of STA 200 according to one exemplary embodiment of the present disclosure. In STA 200 illustrated in FIG. 11, a controller (e.g., corresponding to the control circuitry) performs the transmit power control for a second link (e.g., a STA-STA link or a DiL) to another STA based on a parameter relevant to a first link (e.g., an AP-STA link) to AP 100. The transmitter e.g., corresponding to the transmission circuitry) transmits a signal in the second link in accordance with the transmit power control.

[Configuration Example of AP 100]

Figure 12:
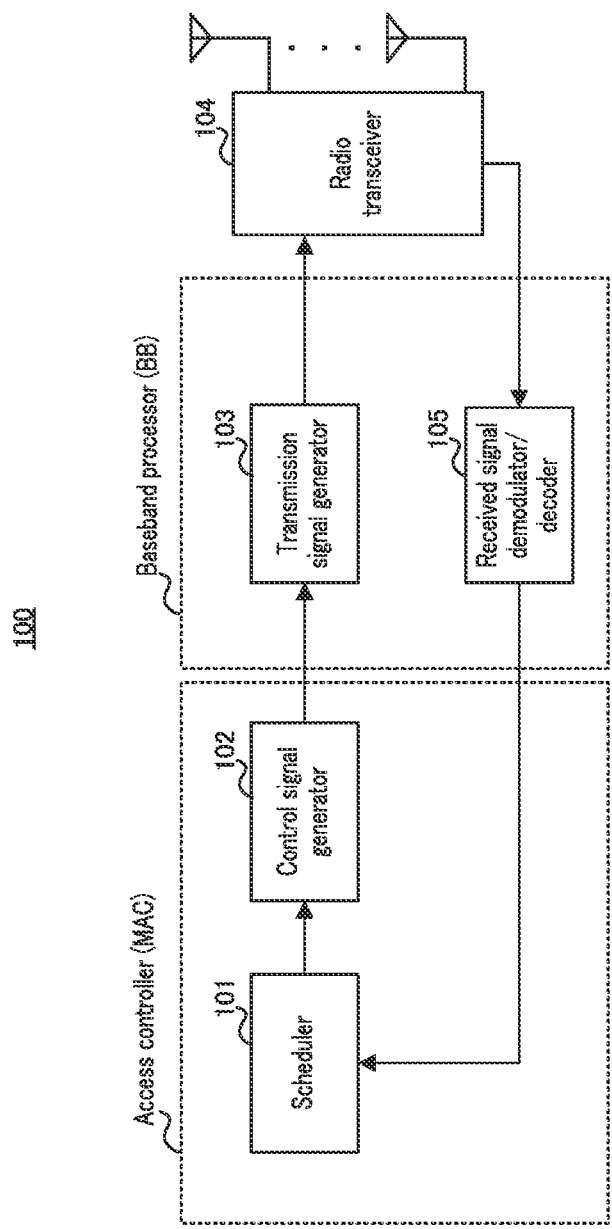
FIG. 12 is a block diagram illustrating an exemplary configuration of an AP.

FIG. 12 is a block diagram illustrating an exemplary configuration of AP 100. AP 100 illustrated in FIG. 12 may include, for example, scheduler 101, control signal generator 102, transmission signal generator 103, radio transceiver 104, and received signal demodulator/decoder 105.

For example, scheduler 101 and control signal generator 102 may be included in an access controller (for example, a MAC processor), and transmission signal generator 103 and received signal demodulator/decoder 105 may be included in a baseband (BB) processor.

Scheduler 101 may control scheduling for STA 200, for example. For example, scheduler 101 may determine scheduling information such as resource allocation and a Modulation and Coding Scheme (MCS) for each STA 200 based on information (for example, feedback information) inputted by received signal demodulator/decoder 105. In addition, scheduler 101 may determine a parameter (for example, a transmit power control parameter) relevant to the transmit power control for the uplink or P2P link, such as the transmit power of AP 100 and Target RSSI. Scheduler 101 may output, for example, control information including the determined scheduling information or the determined transmit power control parameter to control signal generator 102. Note that, a configuration method for configuring the transmit power control parameter (e.g., Target RSSI) for the P2P link will be described later.

Control signal generator 102 may generate a control signal (e.g., Trigger frame) for STA 200, for example. For example, control signal generator 102 may generate the control signal based on the control information (for example, a resource allocation result of assignment of resources to STA 200 or a transmit power control parameter) inputted by scheduler 101.

The control signal may include, for example, at least one of time and frequency resource information (e.g., Resource Unit (RU) allocation information, TXOP, LENGTH, and the like), a transmit power control parameter e.g., transmit power of AP 100, Target RSSI, or the like), information on uplink or P2P link transmission signal generation (e.g., MCS, guard interval (GI), long training field (LTF) mode, and the like), a Trigger type for notifying the type of the control signal, and terminal identification information (e.g., association ID (AID)).

It should be noted that the information (e.g., MCS, GI, LTF mode, etc.) on the P2P link transmission signal generation is not limited to the information determined (or indicated) by AP 100, and may be determined by the DLS STA, for example. In this case, the information such as the MCS, GI, LTF mode, and the like does not have be notified by AP 100. An example of the Trigger frame format for the P2P link will be described later.

Control signal generator 102 outputs, for example, the generated control signal to transmission signal generator 103.

For example, transmission signal generator 103 performs encoding and modulation processing on the control signal inputted by control signal generator 102 or on the data and ACK/Block-ACK. For example, transmission signal generator 103 may generate a radio frame (transmission signal) by adding, to a modulated signal, a pilot signal used by a receiver (for example, STA 200) for frequency synchronization or timing synchronization, a channel estimation signal (for example, LTF, or Extremely High Throughput (EHT)-LTF), and the like. Transmission signal generator 103 outputs the generated transmission signal to radio transceiver 104.

For example, radio transceiver 104 performs radio transmission processing such as D/A conversion and up-conversion into a carrier frequency on the transmission signal inputted by transmission signal generator 103, and transmits the signal after the radio transmission processing via the antenna.

AP 100 may operate as follows, for example, when receiving an uplink signal (e.g., uplink response signal (TB-PPDU)) and feedback information transmitted by STA 200.

The radio signal received via the antenna is inputted to radio transceiver 104. Radio transceiver 104 performs radio reception processing such as down-conversion of the carrier frequency on the received radio signal, for example, and outputs the signal after the radio reception processing to received signal demodulator/decoder 105.

For example, received signal demodulator/decoder 105 may perform processing such as autocorrelation processing on the signal inputted by radio transceiver 104, and extract the received radio frame. Further, received signal demodulator/decoder 105 may decode and demodulate, for example, the uplink response signal (for example, TB-PPDU) and feedback information from STA 200 included in the extracted radio frame. Received signal demodulator/decoder 105 may output the feedback information to scheduler 101, for example.

[Configuration Example of STA 200]

Figure 13:
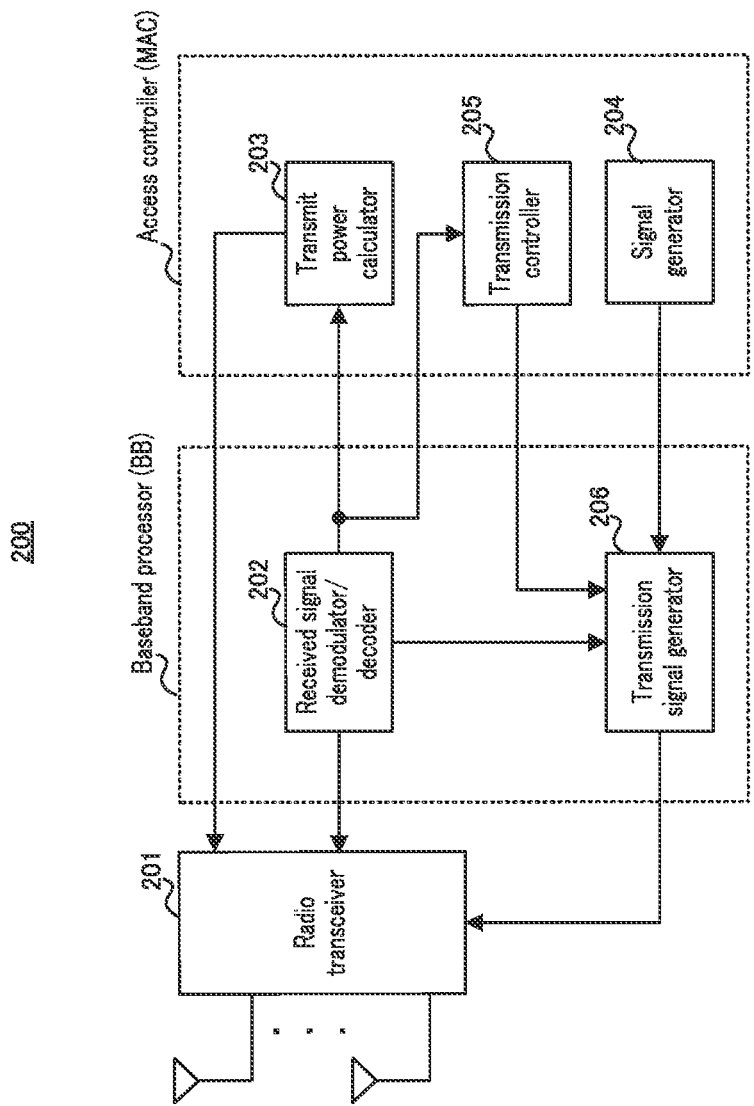
FIG. 13 is a block diagram illustrating an exemplary configuration of the STA.

FIG. 13 is a block diagram illustrating an exemplary configuration of STA 200 according to the present embodiment. STA 200 illustrated in FIG. 13 may include, for example, radio transceiver 201, received signal demodulator/decoder 202, transmit power calculator 203, signal generator 204, transmission controller 205, and transmission signal generator 206.

For example, the controller illustrated in FIG. 11 may correspond to processors related to generation of a transmission signal (for example, received signal demodulator/decoder 202, transmit power calculator 203, signal generator 204, transmission controller 205, transmission signal generator 206, and the like) in FIG. 13. The transmitter illustrated in FIG. 11 may correspond to radio transceiver 201 illustrated in FIG. 13, for example.

Further, for example, transmit power calculator 203, signal generator 204, and transmission controller 205 may be included in the access controller, and received signal demodulator/decoder 202 and transmission signal generator 206 may be included in the baseband processor.

Radio transceiver 201 receives, for example, a signal transmitted by AP 100 or another STA 200 via an antenna, performs radio reception processing such as down-conversion and A/D conversion on the received signal, and outputs the signal after the radio reception processing to received signal demodulator/decoder 202. Further, for example, radio transceiver 201 may perform radio transmission processing such as D/A conversion and up-conversion into a carrier frequency on the signal inputted by transmission signal generator 206. Further, for example, radio transceiver 201 may transmit the signal after the radio transmission processing via the antenna based on the transmit power indicated by transmit power calculator 203.

For example, received signal demodulator/decoder 202 may perform processing such as autocorrelation processing on the signal inputted by radio transceiver 201, and extract the received radio frame. Received signal demodulator/decoder 202 may demodulate and decode, for example, a control signal (e.g., Trigger frame) included in the extracted radio frame, and may output a transmit power control parameter such as AP TX Power or Target RSSI to transmit power calculator 203.

For example, when the extracted radio frame is a signal from another STA 200, received signal demodulator/decoder 202 may demodulate and decode the data, the control signal, and the feedback information included in the radio frame. For example, received signal demodulator/decoder 202 may output the extracted feedback information to transmission controller 205.

Based on, for example, the control information included in the Trigger frame, STA 200 may determine which of the uplink transmission and P2P link transmission the transmission indicated by the Trigger frame is. The control information included in the Trigger frame may be, for example, 1-bit signaling that distinguishes between uplink transmission and P2P link transmission (see, for example, NPL 4).

STA 200 may determine the distinction between the uplink transmission and P2P link transmission based on an AID instead of the above-described 1-bit signaling. In the case of determination based on the AID, STA 200 may have, for example, two AIDs respectively for the uplink communication and P2P link communication. The control of distinguishing between the uplink transmission and P2P link transmission based on the AID may eliminate additional signaling.

STA 200 may also determine to distinguish between the uplink transmission and P2P link transmission based on an unused configuration value (e.g., 15) in the MCS field of the Trigger frame instead of the 1-bit signaling described above. In the case of the P2P link transmission, the MCS may be determined by the DLS STA instead of AP 100. Therefore, based on the configuration value of the MCS which is unused in the Trigger frame for uplink communication in the MCS field unused for the P2P link transmission, STA 200 can determine which of the uplink transmission and P2P link transmission the transmission indicated in the Trigger frame is. Thus, the control of distinguishing between the uplink transmission and P2P link transmission based on the configuration value of the MCS field may eliminate additional signaling. Note that the above-described signaling for distinguishing between the uplink transmission and P2P link transmission is not limited to the unused configuration value of the MCS field, and may be notified by an unused configuration value of another field, for example.

Further, received signal demodulator/decoder 202 may, for example, provide time and frequency resource information (for example, RU allocation information, TXOP, LENGTH, and the like) or control parameters such as the MCS, GI, and LTF mode to transmission signal generator 206.

Transmit power calculator 203 may calculate the transmit power of the uplink signal (for example, the uplink response signal) or P2P signal, for example. For example, transmit power calculator 203 may calculate the transmit power of the uplink response signal or P2P signal based on the transmit power control parameter (for example, AP TX Power and Target RSSI) inputted by received signal demodulator/decoder 202 and a path loss (not illustrated) estimated from a downlink signal. Transmit power calculator 203 may output information on the calculated transmit power to radio transceiver 201, for example. Transmit power calculator 203 calculates the transmit power for P2P link transmission. The term "calculation" may be replaced with "determination."

Signal generator 204 may generate, for example, an uplink response signal or a signal for P2P, and may output the generated uplink response signal or signal for P2P to transmission signal generator 206. The uplink response signal may include, for example, an ID of STA 200 and transmission information of STA 200 (e.g., data, a transmission buffer status notification (e.g., BSR: Buffer Status Report), a DL Data request, or the like).

For example, transmission controller 205 may determine a control parameter relevant to the P2P link transmission, such as the MCS, GI, or LTF mode based on feedback information from another STA 200 that is inputted by received signal demodulator/decoder 202, and may output the determined control parameter to transmission signal generator 206.

Based on, for example, the control parameter (for example, the MCS, GL LIT mode, or the like) inputted by received signal demodulator/decoder 202 or the control parameter inputted by transmission controller 205, transmission signal generator 206 may encode and modulate the uplink response signal or the P2P signal inputted by signal generator 204. Transmission signal generator 206 may generate a radio frame (transmission signal) by adding, for example, to the modulated signal, a control signal (preamble) such as a pilot signal, a channel estimation signal, or the like used for frequency synchronization or timing synchronization by a receiver (for example, AP 100 or other STA 200). Transmission signal generator 206 outputs, for example, the generated transmission signal to radio transceiver 201.

[Operation of AP and STA]

Next, an exemplary operation of AP 100 and STA 200 according to the present embodiment will be described.

In the present embodiment, STA 200 (e.g., DLS STA) may perform the P2P link transmit power control based on, for example, a parameter (e.g., path loss) relevant to a link (e.g., AP-STA link or uplink) between AP 100 and STA 200. The parameter relevant to the AP-STA link may be, for example, a parameter indicating the quality of AP-STA link (or the status of AP-STA link).

Also, for example, AP 100 may transmit information on the transmit power of AP 100 and information on the Target RSSI for the P2P link (e.g., the target received signal strength indicator of a signal received at AP 100 from the DLS STA) to STA 200 being the DLS STA. STA 200 may perform the P2P link transmit power control based on, for example, the transmit power of AP 100, Target RSSI for the P2P link, and the path loss in the link between AP 100 and STA 200.

Figure 14:
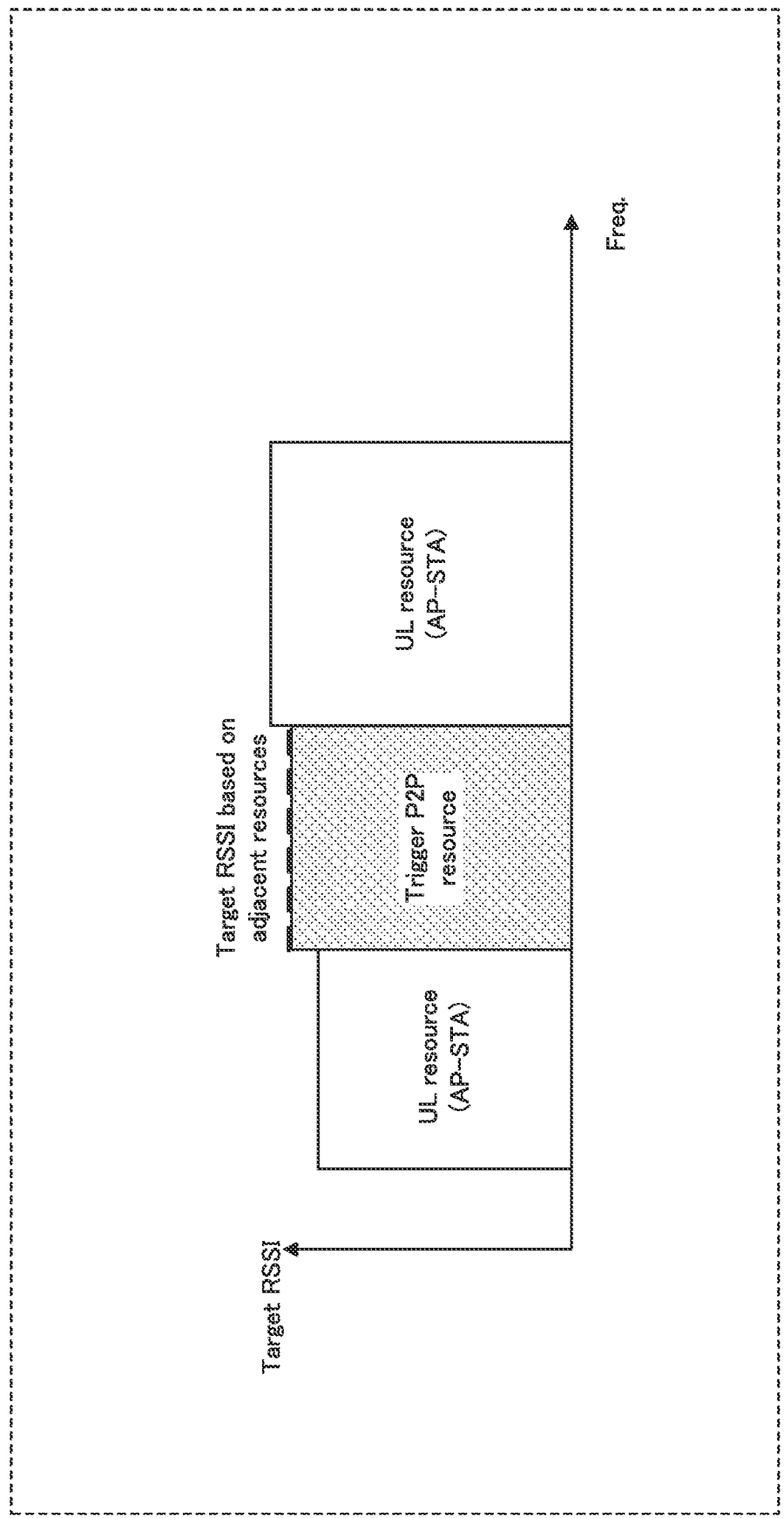
FIG. 14 illustrates one exemplary target Received Signal Strength Indicator (RSSI)

For example, AP 100 may configure the Target RSSI for the P2P link based on the Target RSSI configured for the uplink resource. FIG. 14 is a diagram illustrating an exemplary configuration value of the Target RSSI for the P2P link.

In the example illustrated in FIG. 14, a frequency resource (for example, RU) allocated for the P2P link (or STA-STA link) and frequency resources for the uplink (or AP-STA link) are adjacent to each other. In this situation, AP 100 may determine the Target RSSI for the P2P resource based on, for example, the Target RSSI configured for the uplink resources adjacent to the P2P resource. For example, AP 100 may configure, as the Target RSSI for the P2P resource, any one of the minimum value, the maximum value, and the average value of the Target RSSI for the uplink resources adjacent to the P2P resource.

The Target RSSI configuration for the P2P link makes it more likely, for example, that the received power of a P2P link signal, which may cause interference at AP 100, is similar to the received power of an uplink signal at AP 100. Therefore, in AP 100, the received power difference between the P2P link signal and the uplink signal is reduced. It is thus possible to reduce the interference by the P2P link signal to the uplink signal.

Note that the Target RSSI configuration for the P2P resource is not limited to the minimum value, the maximum value, and the average value of the Target RSSI configured for the adjacent uplink resource. For example, AP 100 may configure, as the Target RSSI for the P2P resource, a value obtained by adding an offset based on an tolerable interference amount to a Target RSSI (for example, a minimum value, a maximum value, or an average value) configured for the uplink resource adjacent to the P2P resource.

Further, the Target RSSI configuration for the P2P resource is not limited to the configuration based on the Target RSSI for the uplink resources adjacent to the P2P resource, and may be based on at least one of the Target RSSI for an uplink resource within a defined range from the P2P resource.

Next, a calculation method for calculating P2P transmit power and an exemplary Trigger frame format will be described.

EXAMPLE 1

In Example 1, STA 200 (e.g., DLS STA) may control the transmit power for the P2P link based on, for example, the status of the uplink (e.g., AP-STA link) and the information indicated in the Trigger frame (e.g., the Target RSSI for the P2P link and the transmit power of AP 100).

One exemplary status of the AP-STA link is path loss in the AP-STA link. For example, STA 200 may control the transmit power for the P2P link based on the path loss in the AP-STA link.

Also, for example, the Trigger frame for P2P may have a format similar to that of the 11ax uplink Trigger frame. FIG. 15 illustrates one example of the Trigger frame for P2P including a Common info field, and FIG. 16 illustrates one example of a User Info field included in the Trigger frame for P2P.

For example, the Common info field illustrated in FIG. 15 may be provided with a field (for example, AP TX Power) indicating the transmit power of AP 100, and the User info filed illustrated in FIG. 16 may be provided with a field (UL Target RSSI) indicating the Target RSSI.

Note that some fields may be absent in the Trigger frame format illustrated in FIGS. 15 and 16, and a new field may be added.

For example, the Target RSSI for the P2P link indicated by the Trigger frame may be regarded as a tolerable interference amount for AP 100.

By way of one example, a configuration example of the radio communication system illustrated in FIG. 8 will be described. STA 2 (e.g., DLS STA) may configure, as the transmit power for the P2P link, a transmit power that is less than or equal to the transmit power (in other words, the upper limit value of the transmit power) calculated based on, for example, the path loss in the AP-STA 2 link, the Target RSSI, and the transmit power of the AP indicated by the Trigger frame.

In other words, STA 200 may perform the P2P link transmit power control, for example, such that the received power for a P2P signal at AP 100 is configured to be equal to or less than the Target RSSI indicated by the Trigger frame. For example, STA 200 may calculate the path loss (e.g., $PL_{AP-STA}$) in the AP-STA link according to Equation 3 based on the received power of the downlink signal from AP 100 (e.g., $DL_{RSSI}$) and the transmit power (e.g., $Tx_{pwr}^{AP}$) of AP 100 indicated by the Trigger frame:

$$PL_{AP-STA} = Tx_{pwr}^{AP} - DL_{RSSI} \quad \text{(Equation 3)}.$$

STA 200 may also calculate the transmit power (e.g., $Tx_{pwr\_limit}$) for the P2P link tolerable for AP 100, according to Equation 4, for example, based on the calculated path loss (e.g., $PL_{AP-STA}$) and Target RSSI (e.g., $Target_{RSSI}$) for the P2P link indicated by the Trigger frame:

$$Tx_{pwr\_limit} = PL_{AP-STA} + Target_{RSSI} \quad \text{(Equation 4)}.$$

Then, STA 200 may configure the transmit power (e.g., $Tx_{pwr}^{P2P}$) for the P2P link transmission such that the transmit power is equal to or lower than the calculated transmit power ($Tx_{pwr\_limit}$), for example, as in Equation 5:

$$Tx_{pwr}^{P2P} \leq Tx_{pwr\_limit} \quad \text{(Equation 5)}.$$

In the following, one exemplary procedure of the P2P link transmit power control will be described.
(Step 1)
STA 200 may determine the transmit power ($Tx_{pwr}$) for the P2P link, e.g., based on information on the P2P link (e.g., quality information). Examples of the information on the P2P link may include, for example, the MCS, the path loss, or the packet error rate in the P2P link. Note that, for example, STA 200 may configure a predetermined transmit power (for example, a fixed transmit power such as the maximum transmit power) as the P2P link transmit power.
(Step 2)
STA 200 may, for example, measure the received power (e.g., $DL_{RSSI}$) of the downlink signal from AP 100 and calculate the path loss (e.g., $PL_{AP-STA}$) in the AP-STA link according to Equation 3 based on the measured received power of the downlink signal and the transmit power (e.g., $Tx_{pwr}^{AP}$) of AP 100 indicated by the Trigger frame, STA 200 then determines the transmit power (e.g., $Tx_{pwr\_limit}$) for the P2P link tolerable for AP 100, according to Equation 4, e.g., based on the path loss and the Target RSSI (e.g., $Target_{RSSI}$) indicated by the Trigger frame.
(Step 3)
For example, according to Equation 6, STA 200 may configure, as the transmit power for the P2P link transmission, the smaller power value from among transmit power $Tx_{pwr}$ calculated in Step 1 and transmit power $Tx_{pwr\_limit}$ calculated in Step 2:

$$Tx_{pwr}^{P2P} = \min(Tx_{pwr\_limit}) \quad \text{(Equation 6)}.$$

As described above, STA 200 performs the P2P link transmit power control based on the path loss in the AP-STA link, for example.

For example, when transmit power $Tx_{pwr}$ calculated based on the information on the P2P link is greater than transmit power $Tx_{pwr\_limit}$ for the P2P link tolerable for AP 100, STA 200 may configure $Tx_{pwr\_limit}$ as the transmit power for the P2P link. Thus, for example, even when the P2P link signal can interfere with AP 100, the effect of interference of the P2P link signal can be reduced in AP 100.

In addition, for example, when transmit power $Tx_{pwr}$ calculated based on the information on the P2P link is equal to or lower than transmit power $Tx_{pwr\_limit}$ for the P2P link tolerable for AP 100, STA 200 may configure $Tx_{pwr}$ as the transmit power for the P2P link. It is thus possible, for example, to suppress the interference to AP 100, and it is possible for STA 200 to perform the P2P link transmission at a transmit power suitable for the status (for example, quality) of the P2P link.

As described above, it is possible to reduce the interference by P2P lurk transmission with the uplink reception processing of AP 100, and it is thus possible to improve the uplink throughput.

EXAMPLE 2

In Example 2, for example, like Example 1, STA 200 (e.g., DLS SEA) may control the transmit power for the P2P link based on the uplink status (e.g., the path loss in the AP-STA link) and the information indicated by the Trigger frame (e.g., the Target RSSI for the P2P link and the transmit power of AP 100).

In Example 2, STA 200 may control the transmit power for the P2P link, e.g., based on the parameters relevant to beamforming in STA 200. For example, when beamforming control is performed to direct NULL in the direction of AP 100, interference to AP 100 by a P2P link signal that STA 200 transmits is reduced. In this case, it is possible for STA 200, for example, to increase the transmit power for the P2P link. In other words, it may be possible to mitigate a limitation on the transmit power for the P2P link in STA 200.

Note that the Trigger frame for P2P in Example 2 may be the same as in Example 1 (for example, FIGS. 15 and 16).

In the following, one exemplary procedure for the P2P link transmit power control will be described.
(Step 1)
STA 200 may determine the transmit power ($Tx_{pwr}$) for the P2P link. e.g., based on information on the P2P link (e.g., quality information). Examples of the P2P link may include, for example, the MCS, the path loss, or the packet error rate in the P2P link, Note that, for example, STA 200 may configure a predetermined transmit power (for example, a fixed transmit power such as the maximum transmit power) to the P2P link transmit power
(Step 2)
STA 200 may, for example, measure the received power (e.g., $DL_{RSSI}$) of the downlink signal from AP 100 and calculate the path loss (e.g., $PL^{AP-STA}$) in the AP-STA link according to Equation 3 based on the measured received power of the downlink signal and the transmit power (e.g., $Tx_{pwr}^{AP}$) of AP 100 indicated by the Trigger frame, STA 200 then determines the transmit power (e.g., $Tx_{pwr\_limit}$) for the P2P link tolerable for AP 100, according to Equation 4, e.g., based on the path loss and the Target RSSI (e.g., $Target_{RSSI}$) indicated by the Trigger frame.
(Step 3)
For example, when transmit power $Tx_{pwr}$ calculated in Step 1 is equal to or lower than transmit power $Tx_{pwr\_limit}$ calculated in Step 2, STA 200 may configure the transmit power for the P2P link to $Tx_{pwr}$ and end the calculation processing for calculating the transmit power for P2P.

On the other hand, for example, when transmit power $Tx_{pwr}$ is greater than transmit power $Tx_{pwr\_limit}$, STA 200 may perform processes from step 4 onward.

(Step 4)

STA 200 may estimate information on the degree of reduction of interference to AP 100 (in other words, a parameter relevant to beamforming; e.g., $BF_{effect}$), for example, based on beamforming applied in STA 200 (e.g., Precoding, antenna-switching control, etc.) and a channel estimation value for the AP-STA channel. The AP-STA channel estimation value may be estimated, for example, from at least one of the EHT-LTF and LTF of the PPDU including the Trigger frame, or may be estimated based on a Null Data Packet (NDP) in the downlink. Also, for example, STA 200 may transmit the NDP to AP 100 and receive feedback information including the channel estimation value obtained by estimation based on the NDP in AP 100.

For example, STA 200 may add an offset (e.g., $BF_{effect}$) corresponding to the degree of reduction of interference to AP 100 to transmit power $Tx_{limit}$ to calculate P2P link transmit power $Tx'_{pwr\_limit}$ to which the offset is added and that is tolerable for AP 100 according to Equation 7. For example, the higher the degree of reduction of the interference to AP 100, the greater the valued of $BF_{effect}$ may be.

$$Tx'_{pwr\_limit} = Tx_{pwr\_limit} + BF_{effect} \quad \text{(Equation 7)}$$

(Step 5)

STA 200 may configure the smaller power value from among transmit power $Tx_{pwr}$ calculated in Step 1 and transmit power $Tx'_{pwr\_limit}$ calculated in Step 4 to the transmit power for the P2P link transmission, for example.

In this way, STA 200 performs the P2P link transmit power control, for example, based on the path loss in the AP-STA link and the parameters relevant to beamforming in STA 200. Thus, like in Example 1, it is possible to reduce the interference by P2P link transmission with the uplink reception processing of AP 100, and it is thus possible to improve the uplink throughput. Further, in Example 2, it is possible to suppress, depending on the beamforming control, the reduction in transmit power for the P2P link for suppressing interference to AP 100 (in other words, it is more likely that the transmit power for the P2P link is increased).

EXAMPLE 3

Examples 1 and 2 have been described in relation to the case where a single tolerable interference amount (for example, Target RSSI) is notified by the Trigger frame. Example 3 will be described in relation to a case where a plurality of tolerable interference amounts (e.g., Target RSSIs) are notified by the Trigger frame.

The plurality of Target RSSIs may be associated respectively with priorities for P2P link transmissions, for example.

For example, a Target RSSI (or a tolerable interference amount) corresponding to a P2P link transmission having a higher priority may be configured more highly, and a Target RSSI (or a tolerable interference amount) corresponding to a P2P link transmission having a lower priority may be configured lower. In other words, the higher the priority of the P2P link transmission is, the higher the transmit power of the communication can be.

FIG. 17 is a diagram illustrating one exemplary Trigger frame format (User Info field) for a case where two priorities (for example, a high priority and a low priority) are configured. The number of priorities to be configured is not limited to two, and may be three or more.

Figure 2:
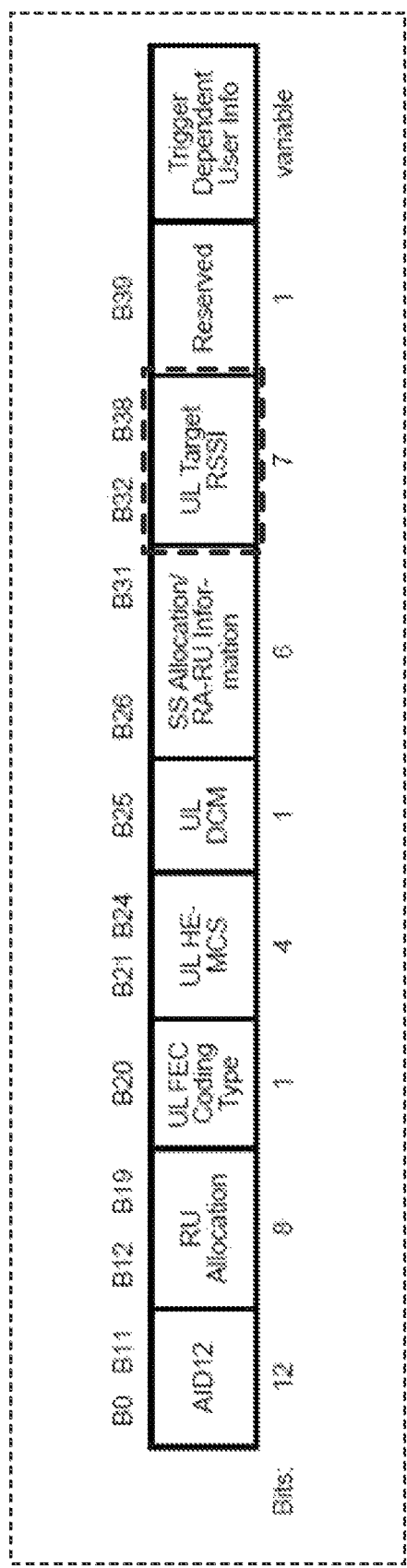
FIG. 2 illustrates one exemplary format of a User Info field.

In FIG. 17, for example, a Target RSSI for a P2P link transmission having a higher priority may be configured in a "UL Target RSSI" field similar to that in 11ax illustrated in FIG. 2, and a Target RSSI for a P2P link transmission having a lower priority may be configured in a "UL Target RSSI #2" field.

For example, as in the case of the configuration value of the "UL Target RSSI" field, the configuration value of the "UL Target RSSI #2" field may be a value indicating the absolute value of RSSI illustrated in FIG. 18 (for example, any value in a 7-bit table) or a value indicating a relative offset from the configuration value of the "UL Target RSSI" field.

Further, for example, when a plurality of Target RSSIs for respective priorities are configured (or notified), the number of bits of the field relevant to "UL Target RSSI" may be configured (or changed) to a value different from the number of bits defined in 11ax. For example, in FIG. 17, the "UL Target RSSI" field may be configured with 4 bits, and the "UL Target RSSI #2" field may be configured with 3 bits. As is understood, it is possible to reduce the overhead of signaling by suppressing an increase in signaling of the Target RSSI. Further, for example, an increase in the number of bits can be suppressed in the User Info field illustrated in FIG. 17 as compared with the User Info field of 11ax. Note that the numbers of bits of the "UL Target RSSI" field and the "UL Target RSSI #2" field are not limited to the above-described example, and may be other numbers of bits.

Here, for example, the smaller the number of bits in the fields relevant to the UL Target RSSIs, the smaller the amount of information that can be notified. Thus, for example, at least one value of a maximum value (for example, −20 dBm in flax) and a minimum value (for example, −1.10 dBm in 11ax) that can be notified in at least one of the "UL Target RSSI" field and the "UL Target RSSI #2" field may be changed. For example, the maximum value that can be notified may be changed to a lower value, or the minimum value that can be notified may be changed to a higher value. In other words, values that can be notified may be changed to values in a narrower range.

Alternatively, for example, the range of Target RSSIs that can be configured by a certain number of bits may be enlarged by increasing the step width of the Target RSSIs. For example, the step width of Target RSSI is a step width of 1 dB in 11ax FIG. 17, for example, the step width of the Target RSSIs may be a step width in units greater than 1 dB (e.g., a step width of 2 dB, 3 dB, 4 dB, or greater).

Further, for example, the "UL-HE-MCS" field or the "UL Dual subcarrier Modulation (DCM)" field illustrated in FIG. 17 may be replaced with a notification field of a plurality of Target RSSIs (for example, "UL Target RSSI #2") (not illustrated). For the P2P link, for example, the MCS and DCM may be determined by the DLS STA and not by AP 100, The DLS STA does not have to be notified of corresponding configuration values of the "UL-HE-MCS" field and the "UL DCM" field from AP 100. Thus, STA 200 (e.g., DLS STA) may receive information on a plurality of Target RSSIs in the "UL-HE-MCS" field and the "UL DCM" field in the Trigger frame.

Note that the present disclosure is not limited to the "UL-HE-MCS" field and the "UL DCM" field, and a field corresponding to a parameter determined by the DLS STA for the P2P link (in other words, a parameter not determined by AP 100) may be replaced with the notification field of a plurality of Target RSSIs.

The priorities may be controlled (or determined or configured) based on, for example, a frame type of a PPDU for the P2P link transmission (e.g., a frame type such as Management or Control frame), an Access category (AC), or TID (or traffic type).

FIGS. 19, 20, 21, and 22 are diagrams illustrating configuration examples of the priority.

FIG. 19 is a diagram illustrating an example in which priorities are configured according to frame types. In FIG. 19, for example, the priority of a frame (e.g., the Management frame or Control frame) for transmitting control information may be configured higher than the priority of a frame (e.g., Data frame) for transmitting data. By the priority configuration illustrated in FIG. 19, it is possible to improve the received quality for receiving the control information, for example, in the P2P link transmission as compared with reception of the data, and therefore, it is possible, for example, to suppress an increase in the delay in a connection process or the like. Note that, the frame types may differ from the types of the Management frame, Control frame, and Data frame.

FIG. 20 is a diagram illustrating an example in which priorities are configured according to the types of transmissions in addition to the frame types in FIG. 19 when the frame types are the same. For example, in FIG. 20, among Control frames, the priorities of the ACK and Block-ACK may be configured higher than the priorities of Control frames of other types than the ACK and Block-ACK, By the priority configuration illustrated in FIG. 20, it is possible to improve the received quality for receiving the ACK and Block-ACK, for example, in the P2P link transmission as compared with reception of other control information. Therefore, it is possible, for example, to suppress an increase in the delay in a retransmission process or the like.

FIG. 21 is a diagram illustrating an example in which priorities are configured according to Access Categories (ACs). In FIG. 21, for example, the priority of an AC (for example, AC_VO (access category voice) AC_VI (access category video)) having a higher delay requirement may be configured higher than the priority of an AC (for example, AC_BK (access category background) or AC_BE (access category best effort)) having a lower delay requirement. By the priority configuration illustrated in FIG. 21, it is possible to suppress a delay of information corresponding to the AC with a higher delay requirement, for example, in the P2P link transmission. Note that the types of AC may be different from the types illustrated in FIG. 21.

FIG. 22 is a diagram illustrating an example in which priorities are configured by TID. In FIG. 22, for example, the priorities may be configured according to the delay requirements corresponding to TIDs. For example, the priority of TID equal to or greater than 4 may be configured higher than the priority of TED less than 4. Note that, in FIG. 22, the threshold for TID regarding the configuration of the priorities is not limited to 4, and may other thresholds. Further, for example, the highest priority may be configured to TID not used in flax (for example, a value greater than 7) as a service having a higher urgency level.

Note that the configurations of the priority illustrated in FIGS. 19, 20, and 22 may be combined. For example, in the combination between the configurations of FIGS. 19 and 21, the priorities of some of the ACs (e.g., AC_VO and AC_VI) of the Management frame, Control frame, and Data frame may be configured higher than the priorities of other ACs of the Data frame (e.g., AC_BK and AC_BE).

Thus, in Example 3, AP 100 may indicate to STA 200 a plurality of Target RSSIs corresponding respectively to the priorities of P2P link transmission. In addition, for example, the corresponding Target RSSIs (or the tolerable interference amounts) may be configured higher for the P2P link transmissions with higher priorities. As a result, STA 200 is capable of configuring a higher transmit power for the high-priority P2P link transmission, for example. It is thus possible to improve the communication quality of the P2P link.

Note that the priorities are not limited to two types (for example, "high (High priority)" and "low (low priority)"), and three or more types may be configured.

The calculation methods for calculating the transmit power for P2P and the exemplary Trigger frame formats have been described above.

As is understood, in the present embodiment, STA 200 performs the P2P link transmit power control (or an STA-STA link) for another STA based on the parameter (for example, the path loss) relevant to the AP-STA link for AP 100, and transmits the signal in the P2P link in accordance with the transmit power control.

By this transmit power control, when both the uplink transmission and P2P link transmission triggered by the Trigger frame are performed, for example, as illustrated in FIG. 8, the interference (for example, Adjacent channel interference) with the AP by the P2P link transmission of STA 2 can be suppressed. Therefore, according to the present embodiment, it is possible to suppress deterioration in the reception performance for reception of the uplink signal and to improve the uplink throughput.

In the present embodiment, STA 200 performs the P2P link transmit power control based on the status of the AP-STA link, but the present invention is not limited to this operation. For example, STA 200 may switch between the transmit power control based on the status of the AP-STA link and the transmit power control based on the status of the P2P (STA-STA) link based on the indication information from AP 100.

The indication information on the switching of the transmit power control may be notified by AP 100 to STA 200 by, for example, a Trigger frame, a beacon, or other control information.

The notification method for notifying the switching of the transmit power control may be, for example, a method for notifying a flag (for example, a 1-bit flag) indicating one of the above-described two types of transmit power control in the User Info field or Common info field of the Trigger frame.

In addition, the switching of the transmit power control may be performed by configuring a certain value in the "UL Target RSSI" field of the User Info field in the Trigger frame, for example. For example, when the configuration value of the "UL Target RSSI" field (e.g., FIG. 18) is '127,' STA 200 performs the transmit power control based on the status of the P2P link, acid when the configuration value of the "UL Target RSSI" field is a value different from '127,' STA 200 pray perform the transmit power control based on the status of the AP-STA link.

For example, based on a resource allocation result of resource allocation for the uplink and P2P link or the parameter configured for the uplink. AP 100 may determine the switching between the transmit power control based on the status of the AP-STA link and the transmit power control based on the status of the P2P (STA-STA) link. For example, when a resource adjacent to a P2P resource t allocated for the uplink by scheduling by AP 100, the uplink is less likely to be affected by the Adjacent channel interference. Alternatively, when a parameter (e.g., MCS) that is robust to the uplink is configured, the uplink is less likely to be affected by the Adjacent channel interference. As is understood, based on the degree of influence of interference that may be exerted by the P2P link to the uplink, AP 100 may indicate to STA 200 the switching of the P2P link transmit power control method. Accordingly, it is possible to prevent the interference of the P2P link transmission with the UL link to suppress deterioration in the P2P link communication quality.

EMBODIMENT 2

Embodiment 1 has been described in relation to the method for controlling the transmit power for the P2P link based on the status of the AP-STA link. Here, in the P2P link transmit power control based on the status of the AP-STA link, it is probable that the quality of the P2P link is not guaranteed. In view of the above, the present embodiment will be described, for example, in relation to a method for the P2P link transmit power control based on the status of the P2P link (or STA-STA link) in addition to the status of the AP-STA link.

The radio communication system according to the present embodiment may include, for example, AP 100 and STA 300.

In the present embodiment, for example, STA 300 (e.g., DLS STA) feeds back information (e.g., quality information) about the status of the P2P link to AP 100, and AP 100 determines the Target RSSI for the P2P link based on the fed-back information on the status of the P2P link. This allows STA 300 to perform the P2P link transmit power control based on, for example, the status of the AP-STA link and the status of the P2P The information on the status of the P2P link may include, for example, information on a Target RSSI (tolerable interference amount) required by the DLS STA (hereinafter referred to as "Required Target RSSI"). For example, STA 300 (DLS STA) may calculate the Required Target RSSI based on the quality information on the P2P link, and notify (or feed back) information on the calculated Required Target RSSI to AP 100. AP 100 may determine (or adjust) the Target RSSI for resources in the P2P link, for example, based on the Required Target RSSI notified by STA 300.

As is understood, it is possible to guarantee the state of the P2P link in the P2P link transmit power control which is based not only on the status of the AP-STA link but also on the state of the P2P link, and thus to reduce the influence of interference by the P2P link transmission to the uplink reception processing of AP 100.

[Configuration of AP]

The configuration example of AP 100 according to the present embodiment may be the same as the configuration example of Embodiment 1. AP 100 may configure (or adjust) the Target RSSI for P2P based on the Required Target RSSI notified by STA 300, for example.

An exemplary configuration method for configuring the Target RSSI for P2P using the Required Target RSSI will be described later.

[Configuration of STA]

Figure 23:
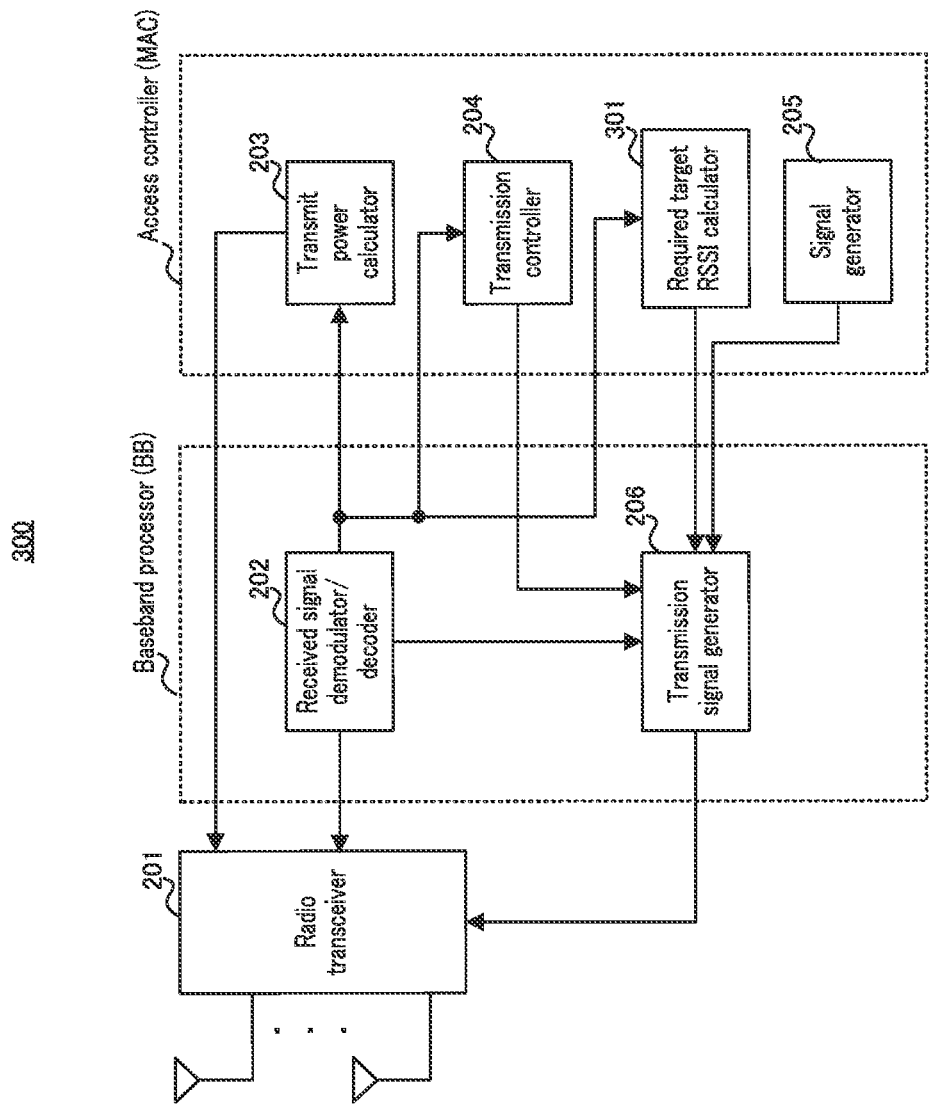
FIG. 23 is a block diagram illustrating an exemplary configuration of the STA.

FIG. 23 is a block diagram illustrating an exemplary configuration STA 300 according to the present embodiment. Note that, in FIG. 23, the same components as those of Embodiment 1 (FIG. 13) are denoted by the same reference numerals, and description thereof will be omitted.

In FIG. 23, for example, based on information such as feedback information (for example, CSI or path loss) from another STA (for example, DLP STA) or a packet error rate in a P2P link inputted by received signal demodulator/decoder 202, Required Target RSSI calculator 301 may calculate a tolerance value (for example, Required. Target RSSI) of an interference amount of interference to AP 100 by the P2P link transmission. An exemplary method for calculating the Required Target RSSI in Required Target RSSI calculator 301 will be described later.

Further, based on, for example, a prescribed format. Required Target RSSI calculator 301 may generate the control information including information on the calculated Required Target RSSI, and may output the control information to transmission signal generator 206.

Note that, the format of the control information including the information on the Required Target RSSI will be described later.

[Operation of AP and STA]

Next, an exemplary operation of AP 100 and STA 300 according to the present embodiment will be described.

<Configuration Method for Target RSSI for P2P>

AP 100 may configure the Target RSSI for a P2P resource (for example, referred to as a configured Target RSSI) based on the Target RSSI configured for an uplink resource adjacent to the P2P resource (for example, RU) allocated by scheduling, for example, as in Embodiment 1 (for example, FIG. 14).

In addition, AP 100 may adjust the configured Target RSSI, for example, based on the Required Target RSSI fed back by STA 300. For example, when the Required Target RSSI is higher than the configured Target RSSI, AP 100 may increase the Target RSSI for the P2P resource to a tolerable interference level.

Also, when increasing the Target RSSI for the P2P resource, AP 100 may reduce the MCS of the uplink resource adjacent to the P2P resource. Thus, for example, even when interference of the P2P resource increases, it is possible to reduce a reception error in reception of uplink data in AP 100. Note that, the parameter to be changed based on adjustment of the Target RSSI for the P2P resource is not limited to the MCS, and may be another parameter.

Further, for example, when the Required Target RSSI is equal to or less than the configured Target RSSI, AP 100 may apply the configured Target RSSI (in other words, the configured Target RSSI does not need to be adjusted).

Note that, for example, AP 100 does not need to assign any P2P resource to STA 300 which has fed back the Required Target RSSI greater than the Required Target RSSI configured for the uplink resource adjacent to the P2P resource. By not assigning a resource to corresponding STA 300, for example, it is possible to eliminate the interference of the P2P link transmission with the uplink reception.

<Required Target RSSI Calculation Method>

An exemplary Required Target RSSI calculation method in STA 300 will be described.

STA 300 may calculate transmit power for the P2P link (e.g., $Tx_{pwr}^{P2P}$) based on feedback information (e.g., CSI or path loss, etc.) from another STA (e.g., DLP STA) in the P2P link, for example. Note that transmit power $Tx_{pwr}^{P2P}$ for the P2P may be a fixed transmit power (for example, the maximum transmit power) defined in advance.

Further, STA 300 may estimate a path loss (e.g., $PL_{Ap\text{-}STA}$) between AP-STA, for example, based on a downlink signal (e.g., a beacon, Trigger frame, etc.) from AP 100.

Then, for example, STA 300 may calculate the Required Target RSSI (RequiredTarget$_{RSSI}$) according to following Equation 8:

$$\text{RequiredTarget}_{RSSI} = \text{Tx}_{pwr}{}^{P2P} - \text{PL}_{Ap-STA} \quad \text{(Equation 8)}$$

<Control Information Format Relevant to Required Target RSSI>

Exemplary formats (for example, formats 1 to 4) of the control information on the Required Target RSSI notified by STA 300 to AP 100 will be described.

<Format 1>

FIG. 24 is a diagram illustrating one example of the format of the control information in Format 1.

The format illustrated in FIG. 24 may be, for example, a format obtained by partially changing the format of a Buffer Status Report (BSR) defined in 11ax (in other words, the control field relevant to the BSR). The format of the BSR may be, for example, the format of a Control Information subfield in a BSR Control subfield included in an HT Control field of a MAC frame.

For example, the control information (e.g., FIG. 7) defined in 11ax may be up to 26 bits long. In addition, in the BSR format of 11ax, each of the 26 bits is used for notification of certain control information. Therefore, when the Required Target RSSI is transmitted together with the BSR, the Required Target RSSI may be notified using some bits corresponding to reduction in the bits of the control information notified in BSR of 11ax. For example, in FIG. 24, the bit sizes of "Queue sizes" (e.g., High and All) may be reduced from 8 bits in 11ax by 2 bits each (e.g., 4 bits in total), and the Required Target RSSI may be transmitted in the 4 bits.

For example, as illustrated in FIG. 18, the BSR may include the Required Target RSSI indicating an absolute value, or may include a offset value from the Target RSSI notified by the Trigger frame or from the Required Target RSSI previously notified by AP 100. For example, in FIG. 24, the hit size of the Required Target RSSI is 4 bits, which is less than the bit size (e.g., 8 bits) of the Target RSSI of 11ax illustrated in FIG. 18. Therefore, the range (or the maximum value (−20 dBm in 11ax) or the minimum value (−110 dBm in 11ax)) that can be notified in the Required Target RSSI field (4 bits) illustrated in FIG. 24 may be changed, and the step width may be a larger step width such as 2 dB or 3 dB, instead of the step width in units of 1 dB.

Note that notification bits of the Required Target RSSI are not limited to 4 bits, and may be another bit size. Further, the position of the notification bits of the Required Target RSSI is not limited to the end of the format of the BSR, and may be another position. Further, in the format of the BSR in which the Required Target RSSI is notified, the control information whose bit size is reduced is not limited to the Queue sizes, and may be other control information.

Here, the Required Target RSSI is, for example, information accompanying data transmitted in the P2P link. In other words, for example, when there is no transmitted data in the P2P link, the Required Target RSSI does not have to be notified. Therefore, as in Format 1, STA 300 can improve the efficiency of notification from STA 300 to AP 100 by transmitting the Required Target RSSI together with the BSR to AP 100.

Further, no new Control frame format needs to be defined when the BSR format defined in 11ax is used for the notification of the Required Target RSSI.

Note that, there are two transmission methods for transmitting the BSR: a method for triggering transmission of the BSR by the Trigger frame transmitted by AP 100 (e.g., referred to as "Solicited BSR" and a method for unsolicitedly transmitting the BSR by STA 300 (e.g., referred to as "Unsolicited BSR"), for example.

Figure 25:
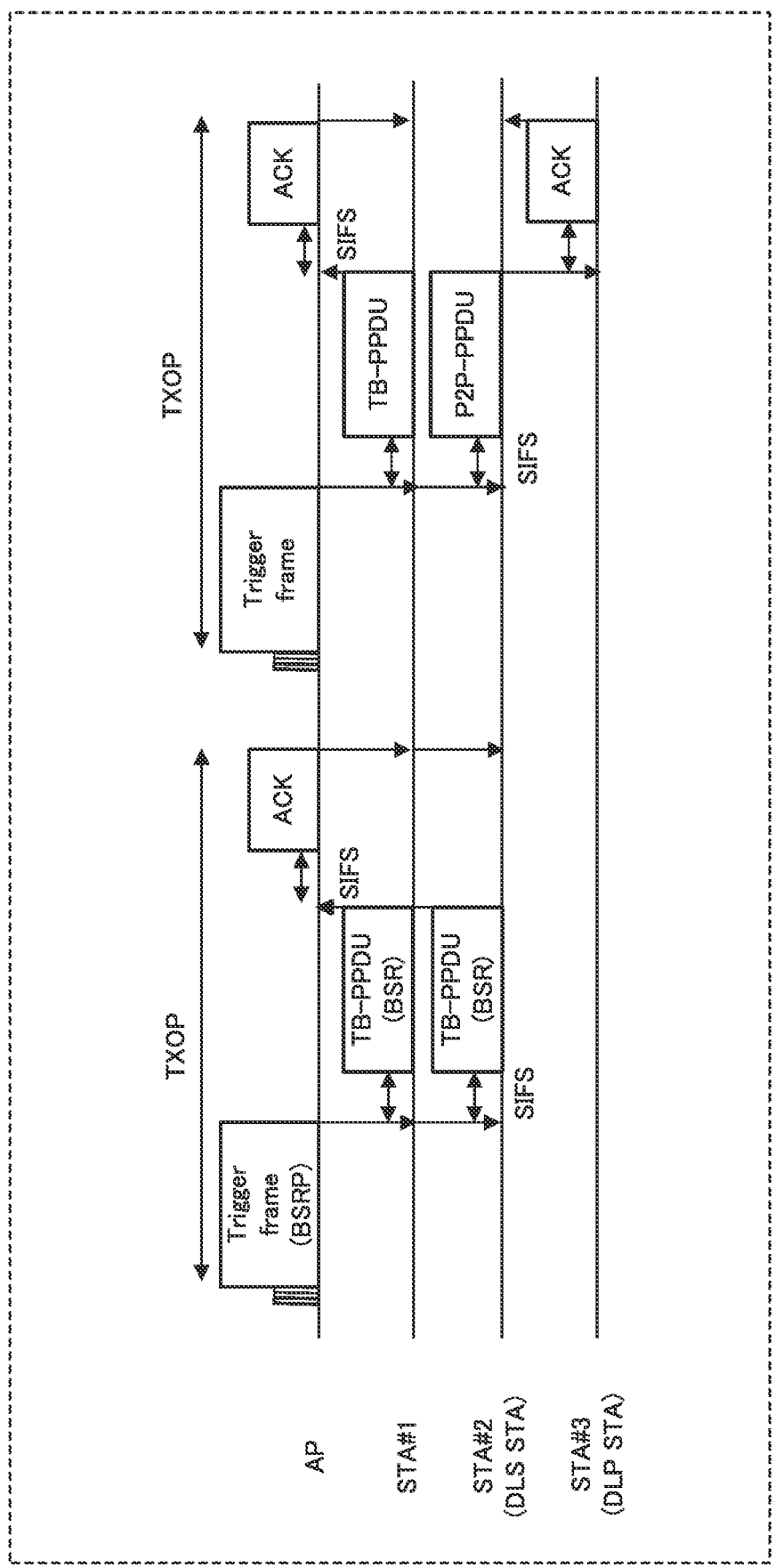
FIG. 25 is a sequence diagram illustrating one example of transmission processing in the radio communication system.

FIG. 25 is a sequence diagram illustrating an exemplary operation of AP 100 (e.g., AP) and STAs 300 (e.g., STA #1, STA #2, and STA 43) for the Solicited BSR. In FIG. 25, the AP may control each of the uplink and P2P link. Further, in FIG. 25, for example, STA 41 may perform uplink communication with the AP. In FIG. 25, for example, STA 42 (DLS STA) and STA #3 (DLP STA) may perform P2P communication, In FIG. 25, upon obtaining TXOP, the AP may transmit a Trigger frame (or control signal) whose type is Buffer States Report Poll (BSRP), to STA #1 and STA #2 (for example, DLS STA). For example, the AP may transmit a common (or the same) Trigger frame to both of STA #1 transmitting the uplink data and STA #2 transmitting the data in the P2P link.

Upon receiving the Trigger frame, STA #1 and STA #2 may transmit BSRs (e.g., TB-PPDUs) to the AP. Note that, for example, STA #1 may transmit the same BSR as in flax (for example, a BSR that does not include a Required Target RSSI) to the AP. Meanwhile, STA #2 may transmit, for example, a BSR in the format illustrated in FIG. 24 (for example, a BSR including a Required Target RSSI) to the AP.

The AP may transmit the Trigger frame that is to trigger the P2P link transmission and uplink transmission, for example, based on the BSRs notified by STA #1 and STA #2. For example, the AP may perform control (for example, configuration of the Target RSSI) relevant to the transmit power for the P2P link based on the Required Target RSSI included in the BSR notified by STA #2.

For example, STA #1 may perform the uplink transmission based on the Trigger frame transmitted by the AP. Further, for example, STA #2 may perform the P2P link transmission (or the transmit power control) to STA #3 based on the Trigger frame transmitted by the AP.

Note that, for example, a flag indicating a solicited Buffer status from among a Buffer status of uplink data and a Buffer status of P2P link data may be configured in (e.g., added to) the Trigger frame. For example, in a Trigger Dependent User info field in a User Info field, a BSR type field indicating the type of the BSR (for example, BSR for uplink or for P2P link) may be configured (for example, added). For example, the bit size of BSR type may be 1 bit. By way of one example, when the BSR type is 0, the uplink may be indicated, and when the BSR type is 1, the P2P link may be indicated.

In addition, when the BSR for the P2P link is requested, information indicating a resource for STA 300 to notify the Required Target RSSI may be configured in (or added to) the Trigger frame. For example, in the Trigger Dependent User info field, a notification field for notifying an RU index or a channel index (for example, a position of a 20 MHz channel) may be configured. STA 300 may feed back the Required Target RSSI to AP 100 using, for example, a resource notified by the RU index or the channel index.

STA 300 may also transmit the BSR for the P2P link, for example in UL-Orthogonal Frequency Division Multiplexing (OFDMA)-based random access (UORA).

Figure 26:
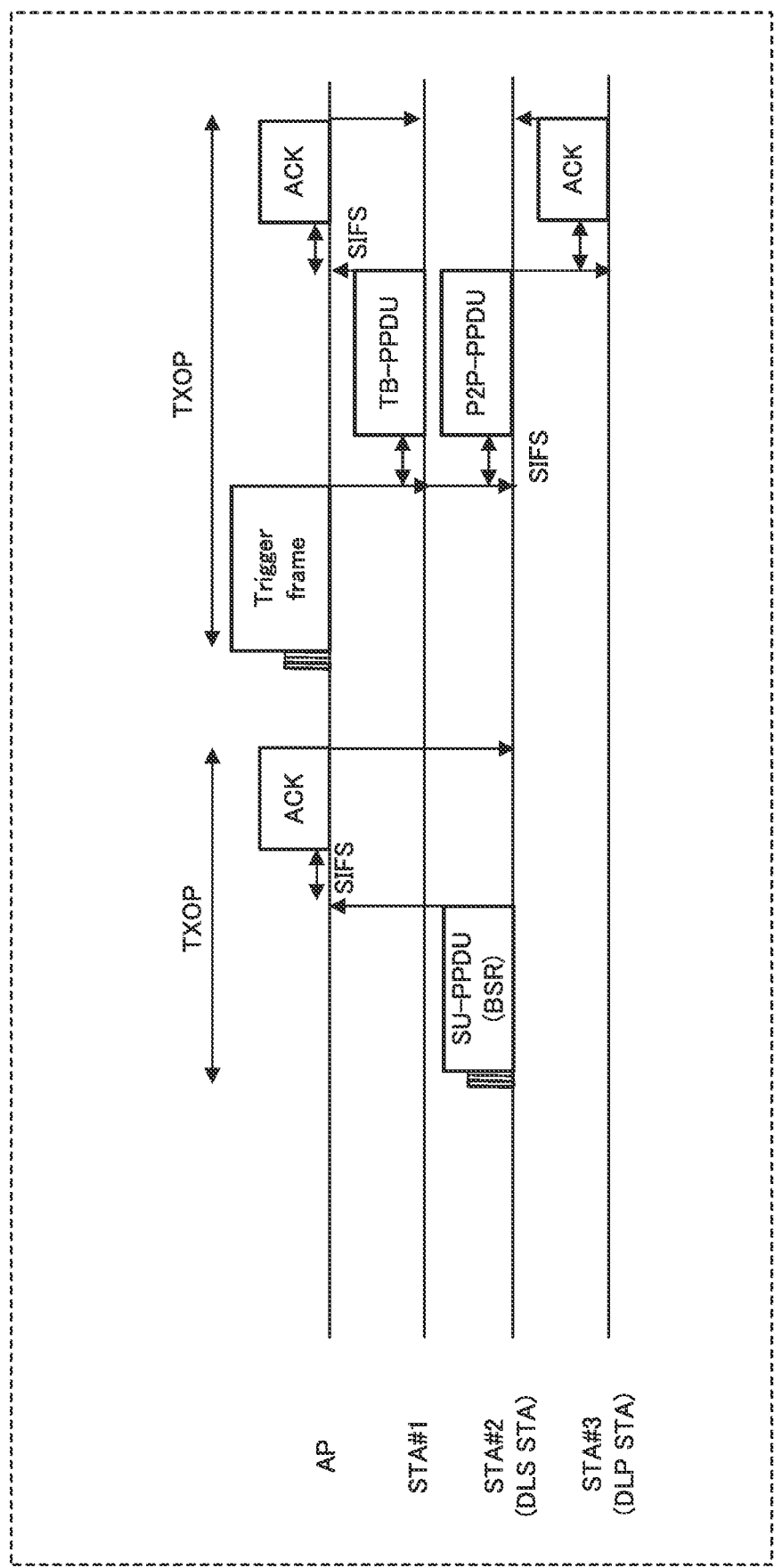
FIG. 26 is a sequence diagram illustrating one example of transmission processing in the radio communication system.

FIG. 26 is a sequence diagram illustrating an exemplary operation of AP 100 (e.g., AP) and STAs 300 (e.g., STA #1, STA #2, and STA #3) in the Unsolicited BSR. In FIG. 26, the AP may control both the uplink and P2P link. Further, in FIG. 26, for example, STA #1 may perform uplink communication with the AP. In FIG. 26, for example, STA #2 (DLS STA) and STA #3 (DLP STA) may perform P2P communication, In FIG. 26, for example, upon obtaining TXOP, STA #2 may transmit a BSR in the format illustrated in FIG. 24 (for example, a BSR including a Required Target RSSI) (for example, a Single User (SU)-PPDU) to the AP. Further, STA #1 may transmit, for example, a BSR similar to that in 11ax (for example, a BSR that does not include a Required Target RSSI) to the AP (not illustrated).

The AP may transmit the Trigger frame that is to trigger the P2P link transmission and uplink transmission, for example, based on the BSRs notified by STA #1 and STA #2. For example, the AP may perform control (for example, configuration of the Target RSSI) relevant to the transmit power for the P2P link based on the Required Target RSSI included in the BSR notified by STA #2.

For example, STA #1 may perform the uplink transmission based on the Trigger frame transmitted by the AP. Further, for example, STA #2 may perform the P2P link transmission (e.g., the transmit power control) to STA #3 based on the Trigger frame transmitted by the AP.

Note that, STA 300 may transmit, to AP 100, information including a flag indicating a Buffer status to be transmitted to AP 100 from among a Buffer status of uplink data and a Buffer status of P2P link data. For example, STA 300 may transmit the information indicating one of the Buffer status of uplink data and the Buffer status of P2P link data to AP 100 by using a TID field (e.g., FIG. 3) in a QoS Control field. For example, when a value (for example, TID>7) of an unused TID for the uplink is configured, the BSR for the P2P link is indicated, and when a TID used for the uplink (for example, TID≤7) is configured, the BSR for the uplink may be indicated. Note that the BSR for the P2P link is, for example, a BSR including the Required Target RSSI as illustrated in FIG. 24, and the BSR for the uplink may be, for example, the same BSR as that in 11ax.

<Format 2>

Figure 27:
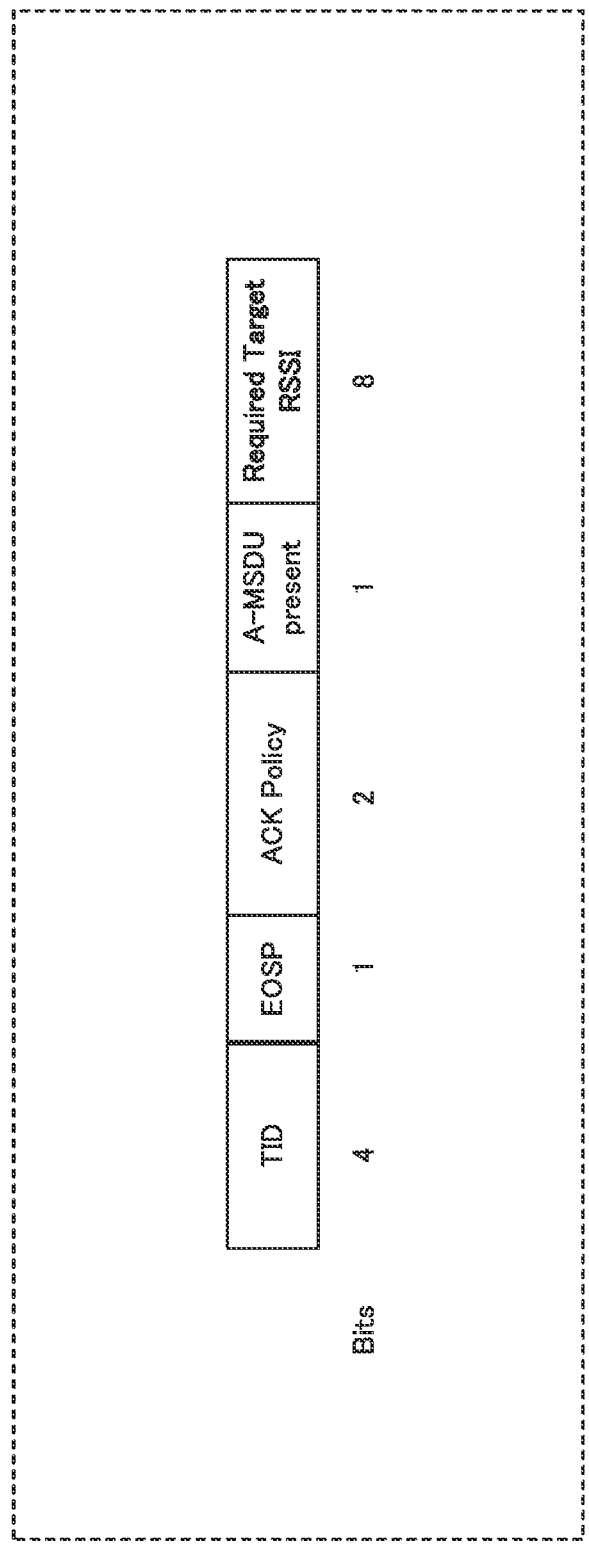
FIG. 27 illustrates one exemplary format of the QoS Control field.

FIG. 27 is a diagram illustrating one example of the format of the control information in Format 2.

The format illustrated in FIG. 27 may be, for example, a format obtained by partially changing the format of the QoS Control field defined in 11ax (in other words, the control field relevant to service quality). Fax example, as illustrated in FIG. 27, the Required Target RSSI may be notified in a part of the QoS Control field. For example, in FIG. 27, the Required Target RSSI field is configured in place of the Queue Size field within the QoS Control field defined in 11ax.

Also, for example, STA 300 may notify AP 100 of whether or not the Required Target RSSI for the P2P link is included in the QoS Control field. For example, STA 300 may notify AP 100 of the presence or absence of the Required Target RSSI according to the configuration value of TID. Fax example, when an unused TID (e.g., TID>7) is configured for the uplink, the QoS Control field format indicating the Required Target RSSI for P2P link may be indicated. Further, for example, when the TID (for example, TID≤7) used for the uplink is configured, the format of QoS Control field similar to that of 11ax (for example, the format not including the Required Target RSSI) may be indicated. Note that the notification of the presence or absence of the Required Target RSSI is not limited to the TID, and may be performed by other information.

As is understood, no new Control frame format needs to be defined when the QoS Control field format defined in 11ax is used for notification of the Required Target RSSI.

Note that, with reference to FIG. 27, one example has been described in which the Required Target RSSI field is configured instead of the Queue Size field within the QoS Control field defined in 11ax, but the present invention is not limited thereto. The Required Target RSSI field may be configured in place of another field within the QoS Control field, for example. In addition, in FIG. 27, the bit size of Required Target RSSI is not limited to 8 bits, and may be another bit size (for example, 4 bits).

In addition, the QoS Control field may include both of the Queue size field and Required Target RSSI field, for example, as illustrated in FIG. 28, Here, the Required Target RSSI is, for example, information accompanying data transmitted in the P2P link. In other words, for example, when there is no transmitted data in the P2P link, the Required Target RSSI does not have to be notified. Thus, as illustrated in FIG. 28, when the Required Target RSSI is transmitted together with the Queue size, it is possible to improve the efficiency of notification from STA 300 to AP 100.

In addition, for example, the number of transmitted bits of each of the Queue size and the Required Target RSSI is not limited to the number illustrated in FIG. 28. For example, as illustrated in FIG. 28, each of the Queue size and the Required Target RSSI may be 4 bits, less than 4 bits, or greater than 4 bits. Further, for example, the Queue size and Required Target RSSI may have different numbers of transmitted bits.

<Format 3>

In Format 3, for example, the control information for Required Target RSSI may be defined. In other words, in Format 3, for example, the Required target RSSI may be transmitted in a format different from the format (or control field) defined in 11ax.

FIG. 29 is a diagram illustrating one example of configuration values of Control ID (for example, information for identifying a type of control information) included in a Control subfield within the FIT Control field.

For example, as illustrated in FIG. 29, a format (for example, referred to as TID-based Buffer status report) of control information for notifying the BSR and Required Target RSSI that is the same as Format 1 may be defined for any of unused Control IDs in flax (for example, Control ID=7). Note that the Control ID for which the Required Target RSSI for the P2P link is defined is not limited to Control ID=7, and may have another value.

Also, for example, in Format 1 (e.g., FIG. 24), the BSR format includes an access category indicator (ACI). On the other hand, in Format 3, for example, the TID may be included. FIG. 30 is a diagram illustrating one exemplary format of the TID-based Buffer status report in Format 3. The format illustrated in FIG. 30 may include, for example, the TID, Queue size, and Required Target RSSI.

As in Format 1, the Required Target RSSI is information accompanying data transmitted in the P2P link, for example. In other words, for example, when there is no transmitted data in the P2P link, the Required Target RSSI does not have to be notified. Thus, as in Format 3, STA 300 can improve the efficiency of the notification from STA 300 to AP 100 by transmitting the Required Target RSSI together with the Queue size to AP 100.

Note that, for example, in Format 3, the TID field may be used to control the switching of the TID-based Buffer status report to be transmitted to AP 100 between the TID-based Buffer status report for uplink (for example, FIG. 31) and the TID-based Buffer status report for the P2P link (for example, FIG. 30). For example, when the value of an unused TID (for example, TID>7) is configured for the uplink, the TID-based Buffer status report for the P2P link illustrated in FIG. 30 is indicated, and when the TID (for example, TID≤7) used for the uplink is configured, the TID-based Buffer status report for the uplink illustrated in FIG. 31 may be indicated, Note that the TID-based Buffer status report for the P2P link may include, for example, the Required Target RSSI as illustrated in FIG. 30. Further, the TID-based Buffer status report for the uplink does not need to include a Required Target RSSI, for example, as illustrated in FIG. 31.

The TID-based Buffer status report may include, for example, other fields different from the fields illustrated in FIGS. 30 and 31. For example, the TID-based Buffer status report may include an Aggregated MAC Service Data Unit (A-MSDU) present field included in BSR.

In addition, a Trigger type for triggering the TID-based Buffer status report may be configured in a control signal (for example, a Trigger frame) notified by AP 100 to STA 300.

In addition, the format for notifying the Required Target RSSI in Format 3 is not limited to the formats illustrated in FIGS. 30 and 31. For example, a mat not including the TID field illustrated in FIGS. 30 and 31 may be defined.

<Format 4>

In Format 4, the control information for Required Target RSSI may be defined, for example, as in Format 3. In other words, in Format 4, for example, the Required target RSSI may be transmitted in a format different from the format (or control field) defined in 11ax.

FIG. 32 is a diagram illustrating one example of configuration values of Control ID (for example, information for identifying a type of control information) included in a Control subfield within the HT Control field.

For example, as illustrated in FIG. 32, a format (for example, referred to as Required Target RSSI report (RTRR)) of control information for notifying the Required Target RSSI may be defined in any of unused Control IDs in 11ax (for example, Control ID=7). Note that Control ID for which the RTRR is defined is not limited to Control ID=7, and may have another value.

FIGS. 33, 34, and 35 are diagrams illustrating one examples of an RTRR format.

The RTRR format illustrated in FIG. 33 may be, for example, a format including the Required Target RSSI field and not including other fields. The Required Target RSSI may be, for example, a 7-bit value similar to the UL Target RSSI included ire the Trigger frame illustrated in FIG. 18, or another value (e.g., an offset value with respect to the UL Target RSSI or a past Required Target RSSI). Since the RTRR format illustrated in FIG. 33 does not include other fields than the Required Target RSSI, it is possible to reduce signaling overhead.

The RTRR format illustrated in FIG. 34 may be, for example, a format including a Required Target RSSI field and a MCS field. In the RTRR format, the MCS in addition to the Required Target RSSI is notified to AP 100. Thus, it becomes easier for AP 100 to adjust the Target RSSI, for example.

For example, when the MCS notified by the RTRR format is high (e.g., when the MCS is higher than or equal to a threshold), AP 100 may reduce the Target RSSI configured for the P2P link. For example, AP 100 may configure a Target RSSI lower than the Required target RSSI. For example, the higher the MCS, the more the STA 300 has room for reduction of the MCS. Thus, for example, when a Target RSSI lower than the Required target RSSI is notified, STA 300 can suppress the transmit power while maintaining the received quality in the P2P link by transmission control such as reduction of the MCS for data (for example, PPDU) transmitted in the P2P link.

Meanwhile, for example, when the MCS notified by the RTRR format is lower (e.g., when the MCS is less than the threshold), AP 100 does not need to reduce the Target RSSI configured for the P2P link. For example, AP 100 may configure a Target RSSI as high as the Required target RSSI. For example, since STA 300 is notified of the Target RSSI as high as the Required target RSSI, STA 300 can transmit data without reducing the MCS of the data (e.g., PPM) to be transmitted in the P2P link and without suppressing the transmit power.

Note that in the RTRR format, the Required Target RSSI may be notified for each MCS.

The format illustrated in FIG. 35 may be, for example, a format including the Required Target RSSI field and the TID (or ACI) field. In the RTRR format, the notification of TID allows AP 100 to determine, for example, the urgency of P2P link transmission (in other words, the delay tolerance). AP 100 may determine whether or not to preferentially allocate resources to the P2P link, for example, based on the urgency of the P2P link transmission.

Note that, the Trigger type for triggering the Required Target RSSI report may be configured in a control signal (for example, a Trigger frame) notified by AP 100 to STA 300.

The exemplary formats of the control information for notifying the Required Target RSSI have been described above, As described above, in the present embodiment, STA 300 transmits to AP 100 the parameter (e.g., Required target RSSI) relevant to the P2P link, and AP 100 receives the Target RSSI determined based on the parameter relevant to the AP-STA link and the parameter relevant to the P2P link. This allows STA 300 to perform the P2P link transmit power control based on, for example, the status of the AP-STA link and the status of the P2P link. Therefore, according to the present embodiment, STA 300 is capable of guaranteeing the quality of the P2P link and suppressing the interference (e.g., Adjacent channel interference) with AP 100 by P2P link transmission by STA 300.

Embodiments of the present disclosure have been described above.

OTHER EMBODIMENTS (1) The above-described embodiments have been described in relation to the transmit power control for the P2P link (for example, the STA 2-STA 3 link illustrated in FIG. 8). However, one exemplary embodiment of the present disclosure is not limited to the P2P link transmit power control, and may be applied to, for example, an STA-AP link (for example, an STA 2-AP #2 link illustrated in FIG. 36). For example, in FIG. 36, when using the Trigger frame to indicate an uplink transmission by STA 2 to AP #2, AP #1 may apply the method of at least one of Embodiments 1 and 2 described above to the STA 2's transmit power control for the uplink (STA 2-AP #2 link). As a result, in FIG. 36, it is possible to reduce interference caused by the uplink transmission by STA 2 with reception processing of AP #1 for receiving an uplink signal from STA 1, and to improve the uplink throughput.

Figure 36:
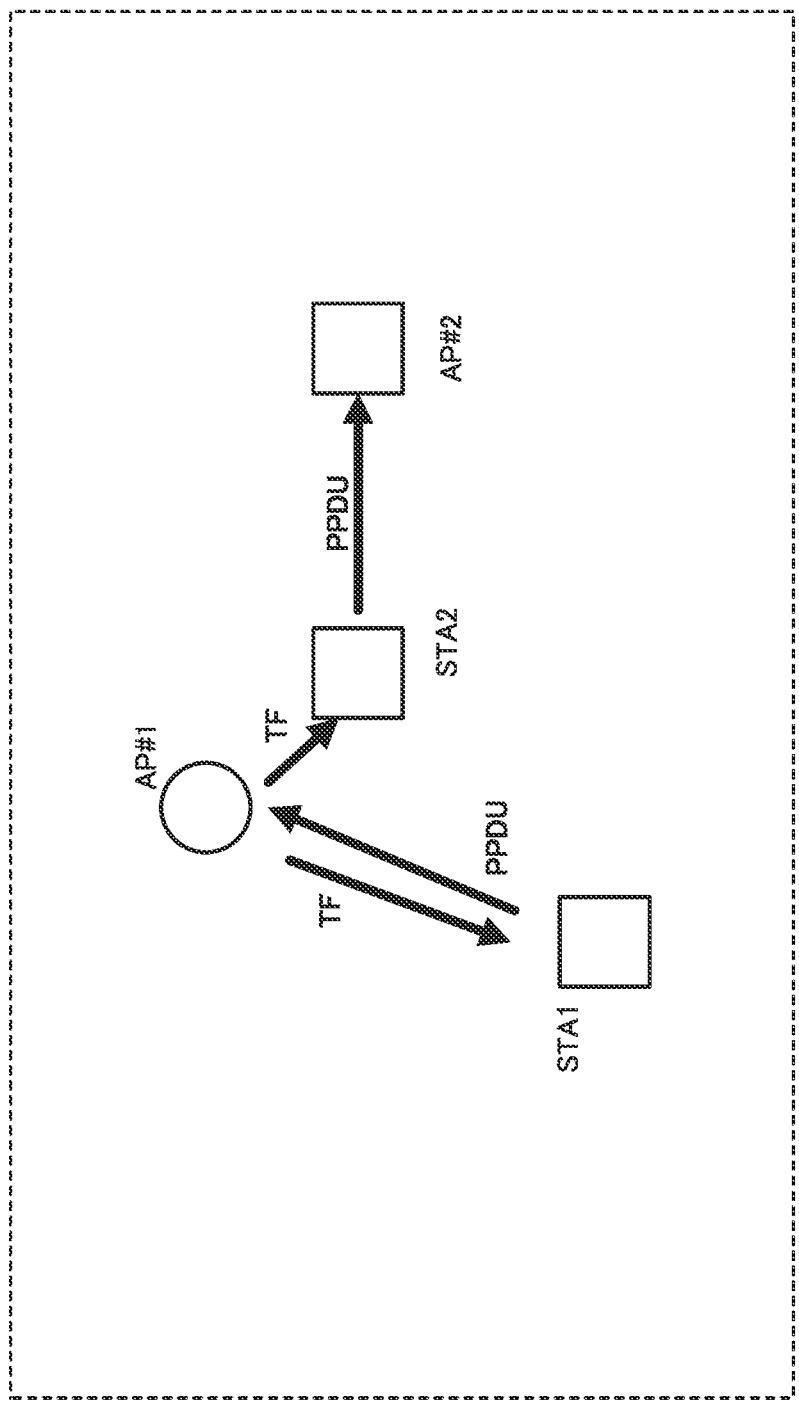
FIG. 36 is a diagram illustrating a configuration example of the radio communication system.

In other words, in the embodiments described above, the transmission by STA 2 that is triggered by the AP is not limited to the transmission for P2P, and a similar transmit power control method may be applied to transmission to a destination different from the AP (e.g., AP in FIG. 8 or AP #1 in FIG. 36).

For example, the destination f the uplink transmission by STA 2 may be an AP in a BSS different from that of STA 2 (for example, a cooperative AP (not illustrated) which performs multiple AP cooperative communication). In this case, the Trigger frame may include, for example, "control information for distinguishing between uplink transmission and other transmission different from the uplink transmission (including P2P link transmission, for example)" in place of the "control information for distinguishing between uplink transmission and P2P link transmission" described in Embodiment 1.

Further, as a variation of the transmission indication method by the Trigger frame, for example, any transmission including uplink transmission may be tolerable. In other words, a designated STA may perform any communication (e.g., P2P communication) within TXOP following the Trigger frame. In this case, the control information in the Trigger frame may be, for example, control information for distinguishing between "a case where the transmission is limited to uplink transmission or a case where other transmission different from the uplink transmission is allowed." Upon receiving the Trigger frame, the STA may interpret the meaning of the Target RSSI in the Trigger frame according to the type of transmission, and perform the transmit power control. For example, the transmit power control method defined in flax may be applied when uplink transmission to the AP having transmitted the Trigger frame is performed, and the transmit power control method described in the above embodiments may be applied when transmission (including, for example, P2P link transmission) different from uplink transmission is performed.

Figure 37:
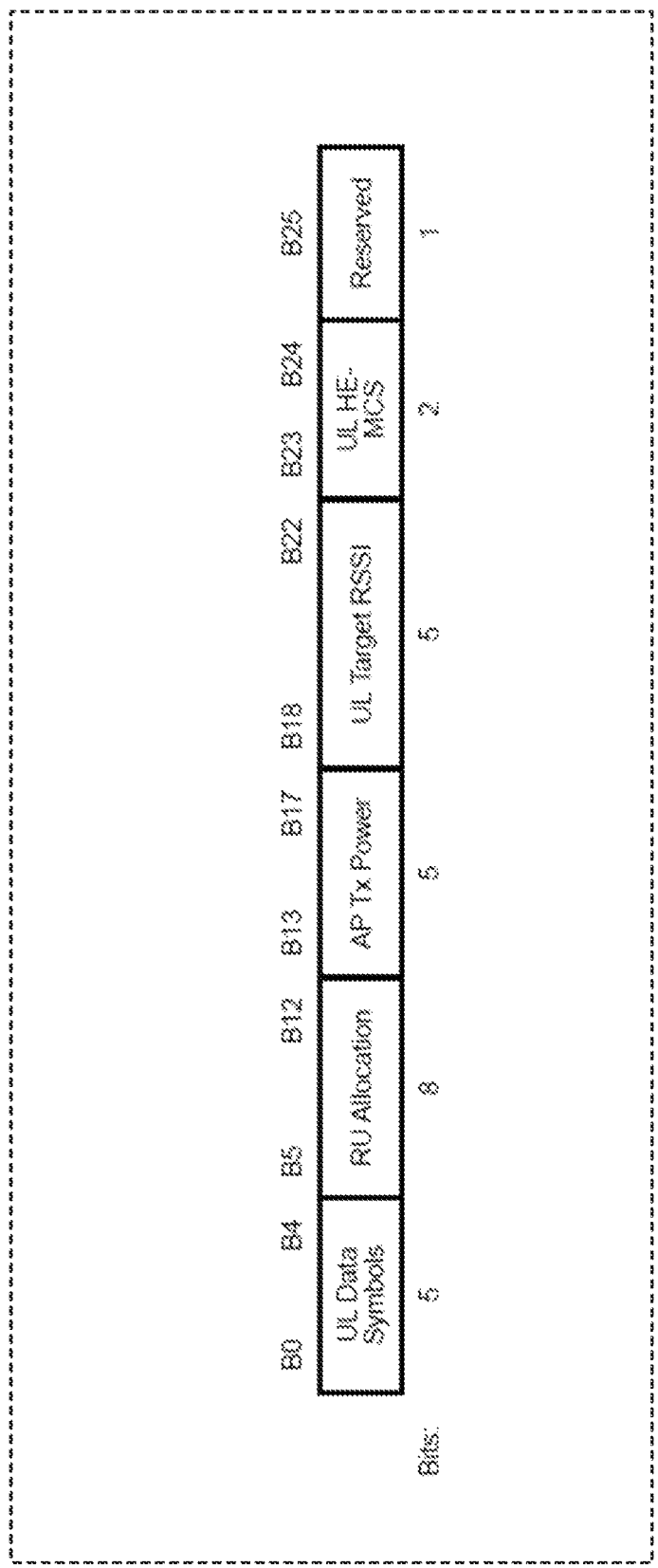
FIG. 37 illustrates one exemplary format of Triggered Response Scheduling.

(2) The above embodiments have been described in relation to the transmit power control method relevant to the P2P link transmission indicated by the Trigger frame, but the method for the P2P link transmit power control is not limited to the method based on the Trigger frame. For example, one exemplary embodiment of the present disclosure is applicable to the P2P link transmission triggered by other control information (Control frame or Management frame) transmitted by AP 100. Examples of the control information include a Triggered response scheduling (TRS) Control (hereinafter, referred to as a TRS). FIG. 37 is a diagram illustrating one exemplary format of TRS, As illustrated in FIG. 37, the IRS like the Trigger frame includes the AP TX Power field and the UL Target RSSI field. Thus, the same transmit power control as that in the case of the Trigger frame can be performed even in the case of TRS.

(3) The above embodiments have been described in relation to the method in which, for example, the Target RSSI included in the Trigger frame is regarded as the tolerable interference amount for AP 100, and the P2P link transmit power control is performed. The P2P link transmit power control may be based, for example, on the configuration value of the UL spatial Reuse field included in the Trigger frame instead of the Target RSSI. For example, when UL spatial Reuse is applied to the P2P link transmit power control, the STA may perform the transmit power control such that interference power based on the Adjacent channel interference is equal to or less than the tolerable interference amount defined in UI spatial Reuse, for example.

Further, the above embodiments have been described in relation to the configuration example based on the format of the control signal of 11ax by way of one example, but the format to which one exemplary embodiment of the present disclosure is applied is not limited to the format of 11ax.

In addition, the formats described in the above embodiments are merely examples, and the present disclosure is not limited thereto. For example, a part of the fields and subfields included in the formats described in the above embodiments may be omitted, fields and subfields for notifying other information may be added, or the order of the fields and subfields may be changed. Further, the terms "field" and "subfield" may be replaced with each other.

In addition, the designations of the information and the fields described in each of the above-described embodiments are merely examples, and the present disclosure is not limited thereto.

Although the above embodiments have been described in relation to uplink communication, the present disclosure is not limited to this, and may be applied to downlink communication.

The expression "section" used in the above-described embodiments may be replaced with another expression such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera. (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to one exemplary embodiment of the present disclosure includes: control circuitry, which, in operation, performs transmit power control for a second link to another terminal based on a parameter relevant to a first link to an access point; and transmission circuitry, which, in operation, transmits a signal in the second link in accordance with the transmit power control.

In one embodiment of the present disclosure, the parameter indicates quality of the first link.

In one exemplary embodiment of the present disclosure, reception circuitry, which, in operation, receives information on a target received signal strength of the signal at the access point and information on a transmit power of the access point, in which the control circuitry performs the transmit power control based on the target received signal strength and the transmit power of the access point.

In one exemplary embodiment the present disclosure, the control circuitry performs the transmit power control based on a parameter relevant to beamforming of the signal.

In one exemplary embodiment of the present disclosure, the reception circuitry receives information on the target received signal strength for each priority with respect to transmission in the second link.

In one exemplary embodiment of the present disclosure, the priority is determined based on at least one of an access category, a traffic type, and a frame type.

In one exemplary embodiment of the present disclosure, the reception circuitry receives information on the target received signal strength in a modulation and coding scheme (MCS) field within a terminal specific information field.

In one exemplary embodiment of the present disclosure, the control circuitry switches, based on indication information, between the transmit power control based on the parameter relevant to the first link and the transmit power control based on a parameter relevant to the second link.

In one exemplary embodiment of the present disclosure, reception circuitry, which, in operation, receives the indication information in a Trigger frame, a beacon, or control information.

In one exemplary embodiment of the present disclosure, transmission circuitry, which, in operation, transmits to the access point a parameter relevant to the second link, in which the reception circuitry receives the information on the target received signal strength determined based on the parameter relevant to the first link and the parameter relevant to the second link.

In one exemplary embodiment of the present disclosure, the parameter relevant to the second link includes the target received signal strength of the signal configured by the terminal.

In one exemplary embodiment of the present disclosure, the transmission circuitry transmits the parameter relevant to the second link in a control field relevant to a buffer status report.

In one exemplary embodiment of the present disclosure, the transmission circuitry transmits the parameter relevant to the second link in a control field relevant to quality of service.

According to one exemplary embodiment of the present disclosure, the transmission circuitry transmits the parameter relevant to the second link in a control field different from a field defined in IEEE802.11ax.

In one exemplary embodiment of the present disclosure, the control field includes information on a traffic type.

In one exemplary embodiment of the present disclosure, based on information on a traffic type, the transmission circuitry switches between a signal format including the target received signal strength and a signal format not including the target received signal strength.

A communication method according to one exemplary embodiment of the present disclosure includes steps performed by a terminal of: performing transmit power control for a second link to another terminal based on a parameter relevant to a first link to an access point; and transmitting a signal in the second link in accordance with the transmit power control.

The disclosure of Japanese Patent Application No. 2020-122948, filed on Jul. 17, 2020, including the specification, drawings and abstract is incorporated herein by reference in its entirety,

INDUSTRIAL APPLICABILITY

One exemplary embodiment of the present disclosure is useful for radio communication systems.

REFERENCE SIGNS LIST

100 AP
101 Scheduler
102 Control signal generator
103, 206 Transmission signal generator
104, 201 Radio transceiver
105, 202 Received signal demodulator/decoder
200, 300 STA
203 Transmit power calculator
204 Signal generator
205 Transmission controller
301 Required target RSSI calculator

The invention claimed is:

1. A terminal, comprising:
control circuitry, which, in operation, performs transmit power control for a second link to another terminal based on a parameter relevant to a first link to an access point;
transmission circuitry, which, in operation, transmits a signal in the second link in accordance with the transmit power control; and reception circuitry, which, in operation, receives information on a target received signal strength of a signal at the access point and information on a transmit power of the access point;

wherein the control circuitry performs the transmit power control based on the target received signal strength and the transmit power of the access point, wherein the target received signal strength is associated with a priority for transmission in the second link, and wherein the reception circuitry receives the information on the target received signal strength in a modulation and coding scheme (MCS) field within a terminal specific information field.

2. The terminal according to claim 1, wherein
the parameter indicates quality of the first link.

3. The terminal according to claim 1, wherein
the control circuitry performs the transmit power control based on a parameter relevant to beamforming of the signal.

4. The terminal according to claim 1, wherein
the priority is determined based on at least one of an access category, a traffic type, and a frame type.

5. The terminal according to claim 1, wherein
the control circuitry switches, based on indication information, between the transmit power control based on the parameter relevant to the first link and a transmit power control based on a parameter relevant to the second link.

6. The terminal according to claim 5, wherein
the reception circuitry, in operation, receives the indication information in a Trigger frame, a beacon, or control information.

7. A communication method, comprising steps performed by a terminal of:

receiving information on a target received signal strength of a signal at an access point and information on a transmit power of the access point, wherein the target received signal strength is associated with a priority for transmission in a second link to another terminal, and the information on the target received signal is received in a modulation and coding scheme MCS) field within a terminal specific information field;

performing transmit power control for the second link, based on a parameter relevant to a first link to the access point, on the target received signal strength, and on the transmit power of the access point; and transmitting a signal in the second link in accordance with the transmit power control.

* * * * *